United States Patent
Kai et al.

(10) Patent No.: US 11,962,916 B2
(45) Date of Patent: Apr. 16, 2024

(54) IMAGING DEVICE WITH TWO SIGNAL PROCESSING CIRCUITRY PARTLY HAVING A SAME TYPE OF SIGNAL PROCESSING, ELECTRONIC APPARATUS INCLUDING IMAGING DEVICE, AND IMAGING METHOD

(71) Applicant: Sony Semiconductor Solutions Corporation, Kanagawa (JP)

(72) Inventors: Hitoshi Kai, Kanagawa (JP); Hiroyuki Ozawa, Kanagawa (JP); Satoshi Yamada, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 98 days.

(21) Appl. No.: 17/765,447

(22) PCT Filed: Oct. 8, 2020

(86) PCT No.: PCT/JP2020/038100
§ 371 (c)(1),
(2) Date: Mar. 31, 2022

(87) PCT Pub. No.: WO2021/070894
PCT Pub. Date: Apr. 15, 2021

(65) Prior Publication Data
US 2022/0385809 A1    Dec. 1, 2022

(30) Foreign Application Priority Data

Oct. 11, 2019   (JP) ................................ 2019-187906

(51) Int. Cl.
*H04N 23/80*   (2023.01)
*H04N 23/61*   (2023.01)

(52) U.S. Cl.
CPC ............. *H04N 23/80* (2023.01); *H04N 23/61* (2023.01)

(58) Field of Classification Search
CPC ........ H04N 23/80; H04N 23/61; H04N 25/70; H04N 23/665; H04N 23/00
(Continued)

(56) References Cited

U.S. PATENT DOCUMENTS

2016/0191744 A1* 6/2016 Miyagi .................... H04N 1/58
                                                             358/3.26

FOREIGN PATENT DOCUMENTS

JP   2013-211715 A   10/2013
JP   2016-82256 A    5/2016
(Continued)

OTHER PUBLICATIONS

International Search Report and Written Opinion dated Dec. 15, 2020, received for PCT Application PCT/JP2020/038100, Filed on Oct. 8, 2020, 8 pages including English Translation.

*Primary Examiner* — Usman A Khan
(74) *Attorney, Agent, or Firm* — XSENSUS LLP

(57) ABSTRACT

An imaging device includes a pixel array part having a plurality of pixels that perform photoelectric conversion, a converter that converts an analog pixel signal output from the pixel array part into digital pixel data, a first signal processing unit that performs first signal processing on the digital pixel data, a second signal processing unit that performs second signal processing that is at least partly shared by the first signal processing on the digital pixel data or data that has been subjected to at least a part of the first signal processing, a recognition processing unit that performs predetermined recognition processing on the basis of output data of the second signal processing unit, and an output interface unit that outputs at least one of output data
(Continued)

of the first signal processing unit and the output data of the recognition processing unit.

13 Claims, 16 Drawing Sheets

(58) Field of Classification Search
USPC .................................................. 348/207.99
See application file for complete search history.

(56) References Cited

FOREIGN PATENT DOCUMENTS

| | | | |
|---|---|---|---|
| JP | 2018-107759 A | 7/2018 | |
| JP | 2019-29750 A | 2/2019 | |
| WO | 2018/051809 A1 | 3/2018 | |
| WO | WO-2018051809 A1 * | 3/2018 | ............... G01C 3/06 |

\* cited by examiner

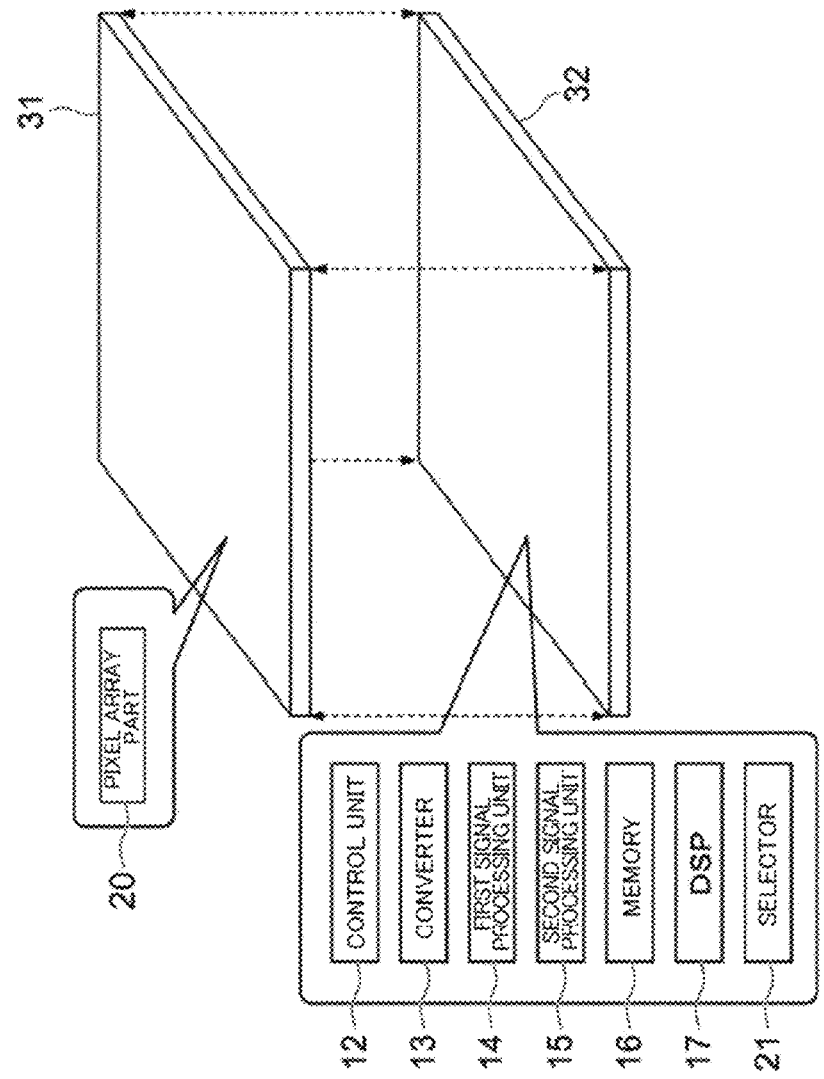

IMAGING DEVICE WITH TWO SIGNAL PROCESSING CIRCUITRY PARTLY HAVING A SAME TYPE OF SIGNAL PROCESSING, ELECTRONIC APPARATUS INCLUDING IMAGING DEVICE, AND IMAGING METHOD

CROSS-REFERENCE TO RELATED APPLICATIONS

The present application is based on PCT filing PCT/JP2020/038100, filed Oct. 8, 2020, and claims priority to Japanese Application No. 2019-187906, filed Oct. 11, 2019, the entire contents of each are incorporated herein by reference.

TECHNICAL FIELD

The present disclosure relates to an imaging device, an electronic apparatus, and an imaging method.

BACKGROUND ART

In recent years, it has been required to perform various types of signal processing on image data captured by an image sensor at a high speed. In addition, with the development of semiconductor process technology, a semiconductor device formed in such a manner that a plurality of chips such as an image sensor chip, a memory chip, and a signal processing chip are connected using bumps and packaged, a semiconductor device formed in such a manner that a die on which an image sensor is disposed and a die on which a memory, a signal processing circuit, and the like are disposed are laminated and packaged, and the like have been proposed.

CITATION LIST

Patent Literature

[PTL 1]
JP 2019-29750 A

SUMMARY

Technical Problem

When a semiconductor device containing an image sensor and a signal processing circuit (hereinafter referred to as an imaging device) is mounted on an electronic apparatus such as a smartphone, the signal processing circuit in the imaging device performs various types of signal processing according to instructions of an application processor mounted on the electronic apparatus in many cases. Since the application processor has a hardware performance capable of performing advanced signal processing at a higher speed as compared to the signal processing circuit in the imaging device in many cases, the signal processing circuit in the imaging device performs signal processing depending on the application processor in general. That is, the signal processing circuit in the imaging device frequently performs signal processing on the premise that advanced signal processing is performed by the application processor.

With the progress of semiconductor process technology, it has become possible to perform advanced signal processing in imaging devices, and thus there is a need for an imaging device which performs various types of signal processing for purposes other than handing over to the application processor and has increased versatility and utility value.

Therefore, the present disclosure provides an imaging, an electronic apparatus, and an imaging method capable of performing various types of signal processing with high reliability without depending on instructions from the outside.

Solution to Problem

To solve the aforementioned problem, one aspect of the present disclosure provides an imaging device including: a pixel array part having a plurality of pixels that perform photoelectric conversion;
  a converter that converts an analog pixel signal output from the pixel array part into digital pixel data;
  a first signal processing unit that performs first signal processing on the digital pixel data;
  a second signal processing unit that performs second signal processing that is at least partly shared by the first signal processing on the digital pixel data or data that has been subjected to at least a part of the first signal processing;
  a recognition processing unit that performs predetermined recognition processing on the basis of output data of the second signal processing unit; and
  an output interface unit that outputs at least one of output data of the first signal processing unit and output data of the recognition processing unit.

The imaging device according to claim 1 may include a selector that selects the output data of the first signal processing unit or output data of the recognition processing unit,
  wherein the output interface unit may output the output data selected by the selector.

The first signal processing unit may perform the first signal processing according to an instruction from the outside, and
  the second signal processing unit may perform the second signal processing according to the recognition processing.

The first signal processing and the second signal processing may include common signal processing, and
  the second signal processing unit may execute signal processing that has not been executed by the first signal processing unit according to an instruction from the outside, in the common signal processing.

The first signal processing and the second signal processing may include common signal processing, and
  the second signal processing unit may execute signal processing, executed by the first signal processing unit under first conditions according to an instruction from the outside, in the common signal processing, under second conditions different from the first conditions.

The first signal processing and the second signal processing may include common signal processing, and
  when a result of signal processing executed by the first signal processing unit according to an instruction from the outside, in the common signal processing, is not suitable for the recognition processing, the second signal processing unit may re-perform the signal processing executed by the first signal processing unit under conditions suitable for the recognition processing.

The digital pixel data output from the converter may be input to both the first signal processing unit and the second signal processing unit, and the first signal processing unit and the second signal processing unit may perform the first signal processing and the second signal processing on the digital pixel data in parallel.

The digital pixel data output from the converter may be input to the first signal processing unit, and data at a stage where the first signal processing unit has performed the first signal processing midway may be input to the second signal processing unit.

The digital pixel data output from the converter may be input to the first signal processing unit, and data output by the first signal processing unit after completing the first signal processing may be input to the second signal processing unit.

The imaging device may include a plurality of communication interface units for individually controlling at least two of the converter, the first signal processing unit, the second signal processing unit, and the recognition processing unit from the outside.

The plurality of communication interface units may individually output at least two of the digital pixel data output from the converter, the output data of the first signal processing unit, the output data of the second signal processing unit, and the output data of the recognition processing unit.

The imaging device may include a first substrate having the pixel array part, and a second substrate that is laminated on the first substrate and includes the converter, the signal processing units, and the light amount detector.

The first substrate and the second substrate may be bonded to each other through any of a Chip on Chip (CoC) method, a Chip on Wafer (CoW) method, and a Wafer on Wafer (WoW) method.

Another aspect of the present disclosure provides an electronic apparatus including an imaging device that outputs captured image data, and a processor that performs predetermined signal processing on the image data, wherein the imaging device includes a pixel array part having a plurality of pixels that perform photoelectric conversion, a converter that converts an analog pixel signal output from the pixel array part into digital pixel data, a first signal processing unit that performs first signal processing on the digital pixel data, a second signal processing unit that performs second signal processing that is at least partly shared by the first signal processing on the digital pixel data or data that has been subjected to at least a part of the first signal processing, a recognition processing unit that performs predetermined recognition processing on the basis of output data of the second signal processing unit, and an output interface unit that outputs at least one of output data of the first signal processing unit and output data of the recognition processing unit.

The imaging device may include a plurality of communication interface units for individually controlling at least two of the converter, the first signal processing unit, the second signal processing unit, and the recognition processing unit.

Another aspect of the present disclosure provides an imaging method including a step of performing photoelectric conversion in a pixel array part to output an analog pixel signal, a step of converting the analog pixel signal into digital pixel data, a step of performing first signal processing on the digital pixel data, a step of performing second signal processing that is at least partly shared by the first signal processing on the digital pixel data or data that has been subjected to at least a part of the first signal processing, a step of performing predetermined recognition processing on the basis of data that has been subjected to the second signal processing, and a step of outputting at least one of the data that has been subjected to the first signal processing and the data that has been subjected to the recognition processing.

BRIEF DESCRIPTION OF DRAWINGS

FIG. 6 is a diagram showing an example of a chip structure of the imaging device of FIG. 1.

DESCRIPTION OF EMBODIMENTS

Hereinafter, embodiments of an imaging device and an electronic apparatus will be described with reference to the drawings. Although the following description will focus on main components of the imaging device and the electronic apparatus, the imaging device and the electronic apparatus may have components and functions which are not illustrated or described. The following description does not exclude components or functions which are not illustrated or mentioned.

First Embodiment

Figure 1:
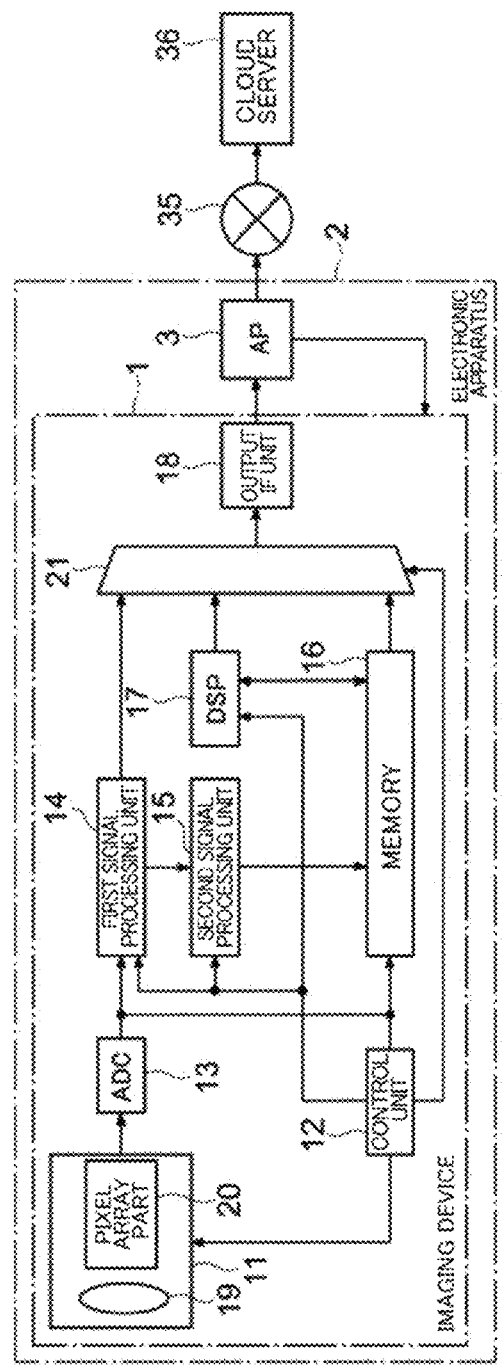
FIG. 1 is a block diagram showing a schematic configuration of an electronic apparatus including an imaging device according to a first embodiment.

FIG. 1 is a block diagram showing a schematic configuration of an electronic apparatus 2 including an imaging device 1 according to a first embodiment. The electronic apparatus 2 of FIG. 1 includes the imaging device 1 and an application processor (AP) 3. The electronic apparatus 2 of FIG. 1 is a smartphone, a mobile phone, a tablet, a PC, a digital camera, or the like having an imaging function, and a specific apparatus is arbitrary.

The imaging device 1 can be realized by one semiconductor device, and this semiconductor device may be referred to as an image sensor or a solid-state imaging device. The imaging device 1 includes an imaging unit 11, a control unit 12, a converter (hereinafter referred to as an analog-to-digital converter (ADC)) 13, a first signal processing unit 14, a second signal processing unit 15, a memory 16, a digital signal processor (DSP) 17, and an output interface unit (output IF unit) 18.

The imaging unit 11 has an optical system 19 and a pixel array part 20. The optical system 19 includes, for example, a zoom lens, a single focus lens, an aperture, and the like. The pixel array part 20 has a plurality of pixels disposed in directions in two dimensions. Each pixel is composed of a plurality of unit pixels for a plurality of colors such as RGB. Each unit pixel has a light receiving element such as a photodiode. The light receiving element photoelectrically converts incident light and outputs an analog pixel signal. Light incident on the imaging unit 11 passes through the optical system 19 and is imaged on a light receiving surface in which a plurality of light receiving elements are arranged. Each light receiving element accumulates electric charge according to the intensity of the incident light and outputs an analog pixel signal depending on the amount of accumulated electric charge.

The control unit 12 controls each unit in the imaging device 1 according to an instruction from the application processor (AP) 3 or the like. The control unit 12 may be integrated with the DSP 17 which will be described later.

The ADC 13 converts the analog pixel signal output from the imaging unit 11 into digital pixel data. Since the ADC 13 performs A/D conversion, the first signal processing unit 14, the second signal processing unit 15, the DSP 17, the memory 16, and the output interface unit 18 subsequent to the ADC 13 handle the digital pixel data. A voltage generation circuit that generates a driving voltage for driving the imaging unit 11 from a power supply voltage or the like may be provided inside the ADC 13 or separately from the ADC 13.

The first signal processing unit 14 performs first signal processing on the digital pixel data. The first signal processing unit 14 performs the first signal processing according to an instruction from the outside, for example, an instruction from the application processor 3. The first signal processing unit 14 may perform the first signal processing on the digital pixel data output from the ADC 13 or perform the first signal processing on digital pixel data output from the ADC 13 and stored in the memory 16. The first signal processing includes various types of signal processing, and details thereof will be described later. Output data of the first signal processing unit 14 is output from the output interface unit 18. Further, as will be described later, data output at a stage where the first signal processing unit 14 has performed the first signal processing midway may be input to the second signal processing unit 15. Alternatively, data output by the first signal processing unit 14 performing the first signal processing to the end may not only be output from the output interface unit 18 but also input to the second signal processing unit 15.

The second signal processing unit 15 performs, for example, second signal processing that is at least partly shared by the first signal processing on the digital pixel data or data that has been subjected to at least a part of the first signal processing. Although details of the second signal processing will be described later, for example, the second signal processing is performed in order to generate data suitable for performing recognition processing. The second signal processing unit 15 may perform the second signal processing on the digital pixel data output from the ADC 13 or perform the second signal processing on the digital pixel data output from the ADC 13 and stored in the memory 16. Alternatively, as described above, the second signal processing unit 15 may perform the second signal processing on the basis of the output data of the first signal processing unit 14. Output data of the second signal processing unit 15 is input to the DSP 17.

The first signal processing and the second signal processing may include common signal processing. In this case, the second signal processing unit 15 executes signal processing that has not been executed by the first signal processing unit 14 according to an instruction from the outside (for example, the application processor 3) among the common signal processing. Alternatively, the second signal processing unit 15 executes signal processing, which has been executed by the first signal processing unit 14 under first conditions according to an instruction from the outside (for example, the application processor 3) among the common signal processing, under second conditions different from the first conditions. Alternatively, when a result of signal processing that has been executed by the first signal processing unit 14 according to an instruction from the outside (for example, the application processor 3) among the common signal processing is not suitable for recognition processing, the second signal processing unit 15 re-performs the signal processing executed by the first signal processing unit 14 under conditions suitable for the recognition processing.

The DSP 17 has a function of a recognition processing unit that performs predetermined recognition processing on the basis of the output data of the second signal processing unit 15. The DSP 17 performs arithmetic operation processing using a machine-learned computation model, for example, by executing a program stored in the memory 16. Various types of information on trained computation models are stored in the memory 16 in advance, and the DSP 17 reads necessary information on a computation model from the memory 16, inputs the output data of the second signal processing unit 15 to the computation model, and performs arithmetic operation processing. Although the specific format of the machine-learned computation model is not limited, it is a computation model according to a deep neural network (hereinafter, DNN), for example. This computation model can be designed on the basis of parameters generated by using the output data of the ADC 13 or the output data of the second signal processing unit 15 as input and inputting training data associated with a label for this input to a trained computation model. Further, the DNN may be composed of a multi-layered neural network. The DSP 17 can perform, for example, predetermined recognition processing according to arithmetic operation processing using the DNN. Here, the recognition processing is processing for automatically recognizing whether or not image data that is the output data of the second signal processing unit 15 includes characteristic image information.

The DSP 17 performs a product-sum operation on a dictionary coefficient stored in the memory 16 and the image data in a process of executing arithmetic operation processing on the basis of the trained computation model stored in the memory 16. The result of the arithmetic operation performed by the DSP 17 is stored in the memory 16 and output from the output interface unit 18. The result of arithmetic operation processing using the computation model performed by the DSP 17 may be image data or various types of information (metadata) obtained from the image data. The DSP 17 or the above-described control unit 12 may have a function of a memory controller that controls writing and reading with respect to the memory 16, or a memory controller may be provided separately from the DSP 17 and the control unit 12. Further, the DSP 17 may perform detection processing such as motion detection processing and face detection processing. The detection processing may be performed by the second signal processing unit 15 instead of the DSP 17. Alternatively, the second signal processing unit 15 and the DSP 17 may perform the detection processing in cooperation.

The memory 16 stores digital pixel data output from the ADC 13, a program executed by the DSP 17, various types of information related to trained computation models used by the DSP 17 for arithmetic operation processing, and the like. Further, the memory 16 may store data of arithmetic operation processing results of the DSP 17. The memory 16 is a readable/writable random access memory (RAM). By exchanging information on computation models in the memory 16, the DSP 17 can execute various machine learning computation models, and thus versatility is improved and the application range is expanded. When the DSP 17 performs arithmetic operation processing according to a computation model for a specific purpose, the memory 16 may be a read only memory (ROM).

The output interface unit 18 outputs the output data of the first signal processing unit 14 or the output data of the DSP 17. A selector 21 may be provided in front of the output interface unit 18. The selector 21 selects the output data of the first signal processing unit 14 or the output data of the DSP 17, for example, on the basis of a selection control signal from the control unit 12. The output interface unit 18 outputs the data selected by the selector 21. The output data of the output interface unit 18 is input to, for example, the application processor 3.

The application processor 3 is a semiconductor device separate from the imaging device 1 and is mounted on the same substrate as that of the imaging device 1 or a different substrate therefrom. The application processor 3 has a central processing unit (CPU) or the like inside thereof and executes programs such as an operating system and various types of application software. The application processor 3 may be provided with a function such as a graphics processing unit (GPU) or a baseband processor that performs image processing, signal processing, or the like. The application processor 3 executes various types of processing on input image data and arithmetic operation results as necessary, controls a display unit of the electronic apparatus 2 such that an image is displayed, and transmits the image data and the arithmetic operation results to an external cloud server 36 via a predetermined network 35.

Meanwhile, as the predetermined network 35, various communication networks such as the Internet, a wired local area network (LAN), a wireless LAN, a mobile communication network, and short range wireless communication such as Bluetooth (registered trademark) are applicable. Further, a destination of the image data and the arithmetic operation results is not limited to the cloud server 36 and may be various recognition processing devices having a communication function, such as a stand-alone server, a file server, and a communication terminal such as a mobile phone.

(Internal Configuration of First Signal Processing Unit 14 and Second Signal Processing Unit 15)

Figure 2:
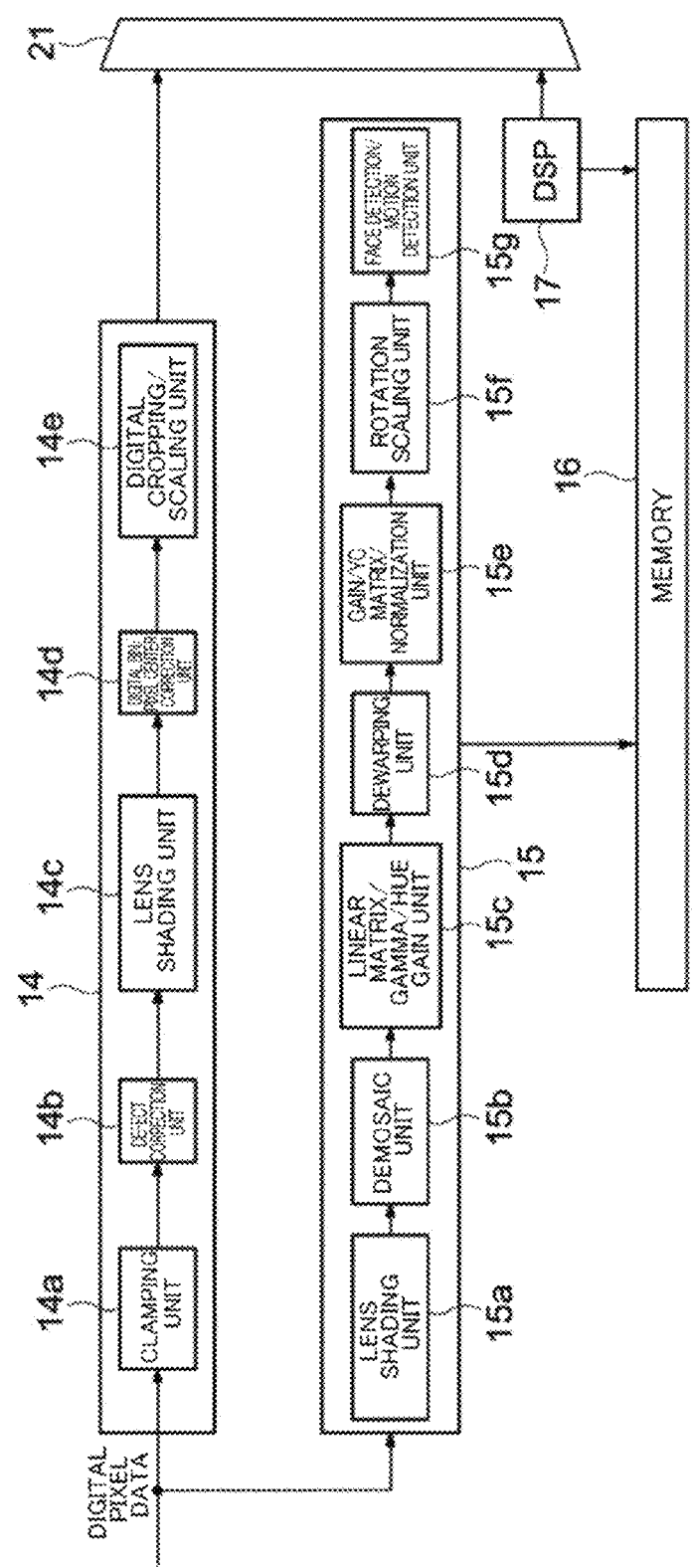
FIG. 2 is a block diagram showing a first example of an internal configuration of a first signal processing unit and a second signal processing unit.

FIG. 2 is a block diagram showing a first example of an internal configuration of the first signal processing unit 14 and the second signal processing unit 15. In the first example of FIG. 2, digital pixel data from the ADC 13 is branched and input to the first signal processing unit 14 and the second signal processing unit 15, and the first signal processing performed by the first signal processing unit 14 and the second signal processing performed by the second signal processing unit 15 are executed in parallel.

The first signal processing unit 14 includes, for example, a clamping unit 14a, a defect correction unit 14b, a lens shading unit 14c, a digital bin/pixel center correction unit 14d, and a digital cropping/scaling unit 14e. Meanwhile, signal processing in the first signal processing unit 14 shown in FIG. 2 is an example, and at least a part of illustrated signal processing may be omitted or signal processing that is not illustrated may be added. In the present description, signal processing performed in each unit in the first signal processing unit 14 is collectively referred to as the first signal processing.

The clamping unit 14a performs processing for defining a black level. The defect correction unit 14b performs processing for interpolating pixel defects using peripheral pixel data. Processing performed by the defect correction unit 14b includes static defect correction processing and dynamic defect correction processing. The defect correction unit 14b performs the static defect correction processing and then performs the dynamic defect correction processing as needed. The static defect correction processing is processing for fixedly interpolating known defective pixels using peripheral pixel data. In the dynamic defect correction processing, a correction position of a defective pixel is not designated, and correction is determined from peripheral pixel information. It may be performed as needed because power consumption is high.

When subject light passes through a lens, the surrounding part becomes dark, and thus the lens shading unit 14c performs processing for increasing pixel values of the surrounding part. When a full-size image is reduced, the center of colors shifts, and thus the digital bin/pixel center correction unit 14d performs processing for averaging the colors as a whole. The digital cropping/scaling unit 14e adjusts an image size according to the display resolution of the display unit of the electronic apparatus 2.

The second signal processing unit 15 includes a lens shading unit 15a, a demosaic unit 15b, a linear matrix/gamma/hue gain unit 15c, a dewarping unit 15d, a gain/YC matrix/normalization unit 15e, a rotation scaling unit 15f, and a face detection/motion detection unit 15g. In the present description, signal processing performed in each unit in the second signal processing unit 15 is collectively referred to as the second signal processing.

The lens shading unit 15a performs processing for increasing pixel values of a surrounding part in the same manner as the lens shading unit 14c in the first signal processing unit 14. The demosaic unit 15b generates pixel data of three colors (RGB) from a color scheme of four colors. The linear matrix/gamma/hue gain unit 15c performs image linearizion, gamma correction, and color adjustment in this order. The dewarping unit 15d corrects a distorted image into a flat image as much as possible through a fisheye lens or a wide-angle lens. The dewarping unit 15d performs correction processing using an adjustment table provided for each lens. The gain/YC matrix/normalization unit 15e performs gain adjustment for input to a DNN, color adjustment, and normalization processing in this order. Digital pixel data from the ADC 13 has a pixel value of 8 to 12 bits, whereas input data of the DNN has a pixel value of 0 to 1, and thus bit shift and normalization processing are required.

The rotation scaling unit 15f performs image rotation processing. If image data in an orientation assumed in advance is not input to the DNN, an error occurs in a recognition rate, and thus the rotation scaling unit 15f rotates the image data in the orientation assumed in advance. The face detection/motion detection unit 15g performs face detection processing and motion detection processing in parallel.

In the example of FIG. 2, the first signal processing unit 14 and the second signal processing unit 15 perform the first signal processing and the second signal processing in parallel because the digital pixel data from the ADC 13 is input to both the first signal processing unit 14 and the second signal processing unit 15. The output data of the first signal processing unit 14 is input to the selector 21. The output data of the second signal processing unit 15 is stored in the memory 16. The DSP 17 reads the output data of the second signal processing unit 15 stored in the memory 16, provides, as input data, the output data of the second signal processing unit 15 to a computation model that is read from the memory 16, and performs arithmetic operation processing. Output data representing results of arithmetic operation processing performed by the DSP 17 is input to the selector 21. The output data of the second signal processing unit 15 may be directly input to the DSP 17 without passing through the memory 16.

A recent application processor 3 has high processing performance and performs more advanced signal processing therein without performing signal processing in the first signal processing unit 14 in the imaging device 1 in many cases. In this case, the application processor 3 may instruct the first signal processing unit 14 not to perform at least a part of the first signal processing that should be originally performed by the first signal processing unit 14. Upon receiving this instruction, the first signal processing unit 14 outputs data obtained by performing the first signal processing according to the instruction of the application processor 3. For example, if the application processor 3 can perform higher performance processing than the first signal processing unit 14 with respect to defect correction processing and lens shading processing, the application processor 3 may instruct the first signal processing unit 14 not to perform processing of the defect correction unit 14b and the lens shading unit 14c. Therefore, the first signal processing unit 14 outputs data as a result of performing the first signal processing other than the defect correction processing and the lens shading processing.

On the other hand, in order to perform arithmetic operation processing using the DNN by DSP 17, it may be desirable to input image data on which defect correction processing and lens shading processing have been appropriately performed to the DNN. As described above, the data as a result of performing the first signal processing is optimal data for the application processor 3 because the first signal processing unit 14 performs the first signal processing according to the instruction of the application processor 3, but it is not always optimal as DNN input data. Therefore, the second signal processing unit 15 in FIG. 2 can perform the second signal processing in order to generate optimal data as input data of the DNN regardless of the first signal processing unit 14.

Although FIG. 2 shows an example in which the first signal processing unit 14 and the second signal processing unit 15 separately perform the first signal processing and the second signal processing in parallel from the beginning to the end, parts of details of the first signal processing and details of the second signal processing are redundant but the others are different. Specifically, processing of the clamping unit 14a and the defect correction unit 14b in the first signal processing is not present in the second signal processing. In the case of FIG. 2, since the result of the second signal processing performed by the second signal processing unit 15 is input to the DNN, results of processing of the clamping unit 14a and the defect correction unit 14b in the first signal processing cannot be input to the DNN. Therefore, the second signal processing may be performed after a part of the first signal processing that is not present in the second signal processing is performed.

Figure 3:
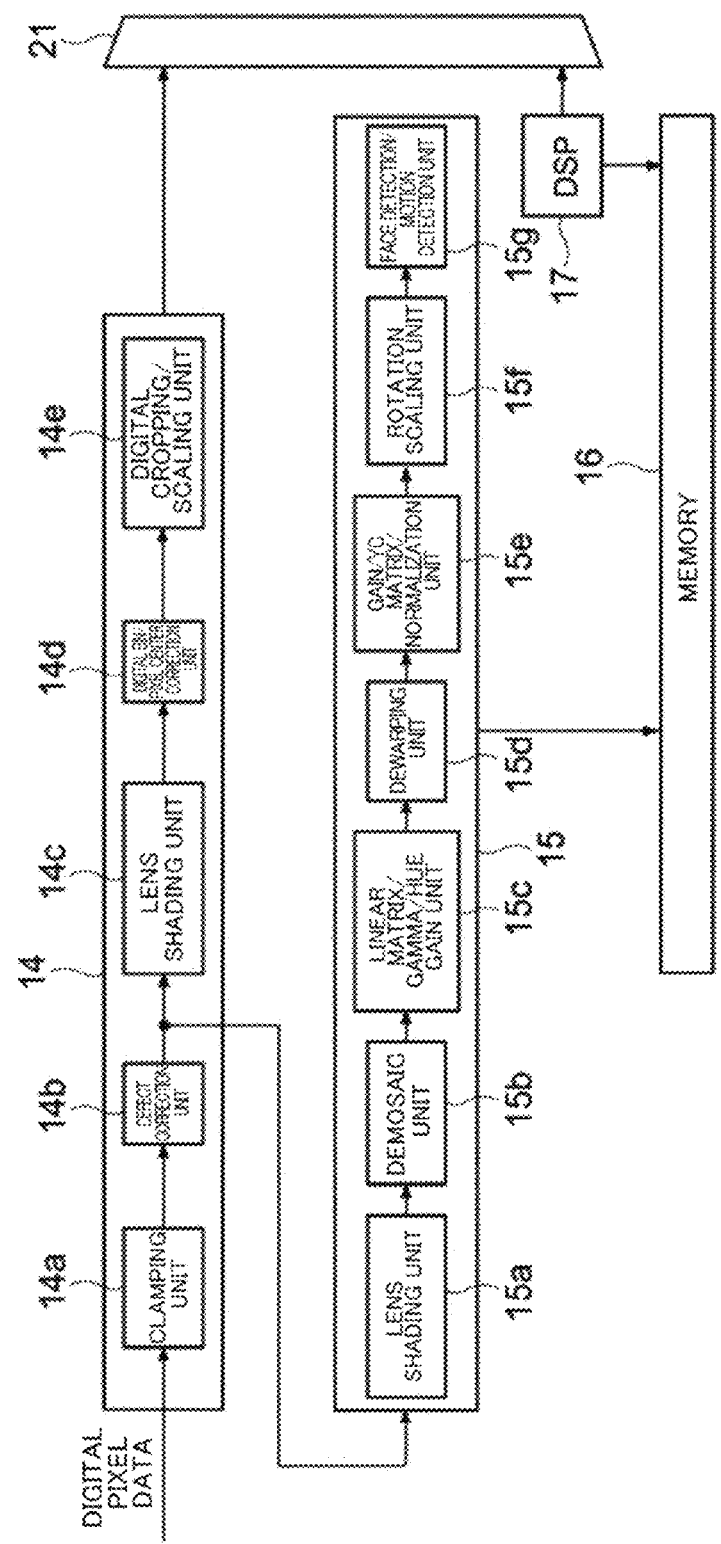
FIG. 3 is a block diagram showing a second example of the internal configuration of the first signal processing unit and the second signal processing unit.

FIG. 3 is a block diagram showing a second example of the internal configuration of the first signal processing unit 14 and the second signal processing unit 15. In FIG. 3, specific details of the first signal processing and the second signal processing are the same as those in FIG. 2 but differ from FIG. 2 in that the first signal processing unit 14 performs the first signal processing midway and then the second signal processing unit 15 starts the second signal processing. More specifically, after the first signal processing unit 14 performs processing of the clamping unit 14a and the defect correction unit 14b, the second signal processing unit 15 starts the second signal processing in FIG. 3. In the example of FIG. 3, it is assumed that the application processor 3 instructs the first signal processing unit 14 not to perform processing of at least one of the lens shading unit 14c, the digital bin/pixel center correction unit 14d, and the digital cropping/scaling unit 14e but does not instruct the first signal processing unit 14 not to perform processing of the clamping unit 14a and the defect correction unit 14b. Therefore, data as results of processing of the clamping unit 14a and the defect correction unit 14b performed by the first signal processing unit 14 is input to the second signal processing unit 15 to start the second signal processing.

Accordingly, since processing of the second signal processing unit 15 is executed after some signal processing that are not present in the second signal processing unit 15 and are present in the first signal processing unit 14 are performed in the example of FIG. 3, data input to the DNN reflects a part of the first signal processing. Therefore, optimal data can be input through arithmetic operation processing performed by the DNN.

Meanwhile, although FIG. 3 shows an example in which the second signal processing unit 15 starts the second signal processing after the first signal processing unit 14 performs processing of the clamping unit 14a and the defect correction unit 14b, which signal processing in the first signal processing unit 14 is performed before starting of the second signal performed by the second signal processing unit 15 is arbitrary and various modified examples are conceivable.

Figure 4:
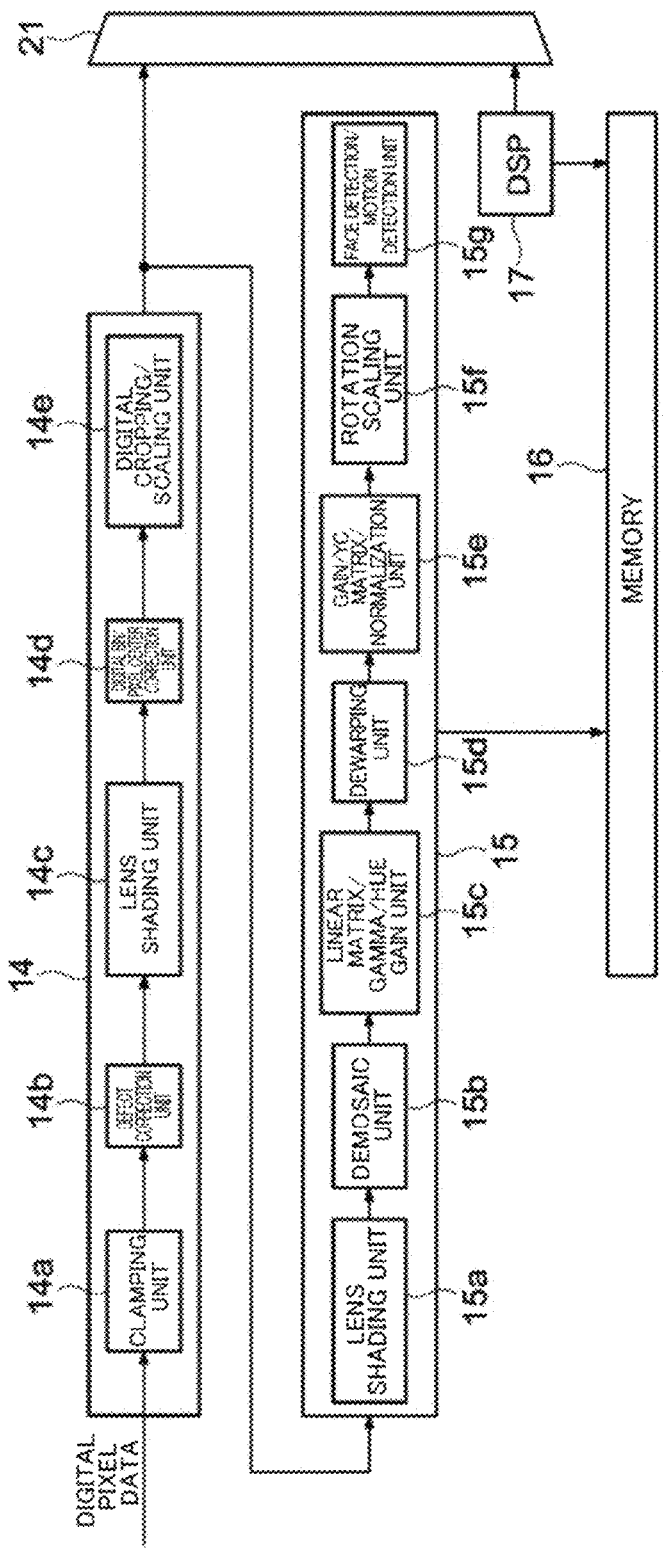
FIG. 4 is a block diagram showing a third example of the internal configuration of the first signal processing unit and the second signal processing unit.

FIG. 4 is a block diagram showing a third example of the internal configuration of the first signal processing unit 14 and the second signal processing unit 15. In FIG. 4, data after the first signal processing unit 14 has completed all the first signal processing is input to the second signal processing unit 15. Although the lens shading unit 14c or 15a is provided in both the first signal processing unit 14 and the second signal processing unit 15, the darkness of surroundings of pixels can be further improved, for example, by differentiating specific details of lens shading processing. In the case of FIG. 4, the second signal processing unit 15 performs the second signal processing using the result of the first signal processing performed by the first signal processing unit 14 as it is according to the instruction of the application processor 3. Accordingly, the third example of FIG. 4 is effective when it is desired to also execute the second signal processing according to the instruction of the application processor 3.

Figure 5:
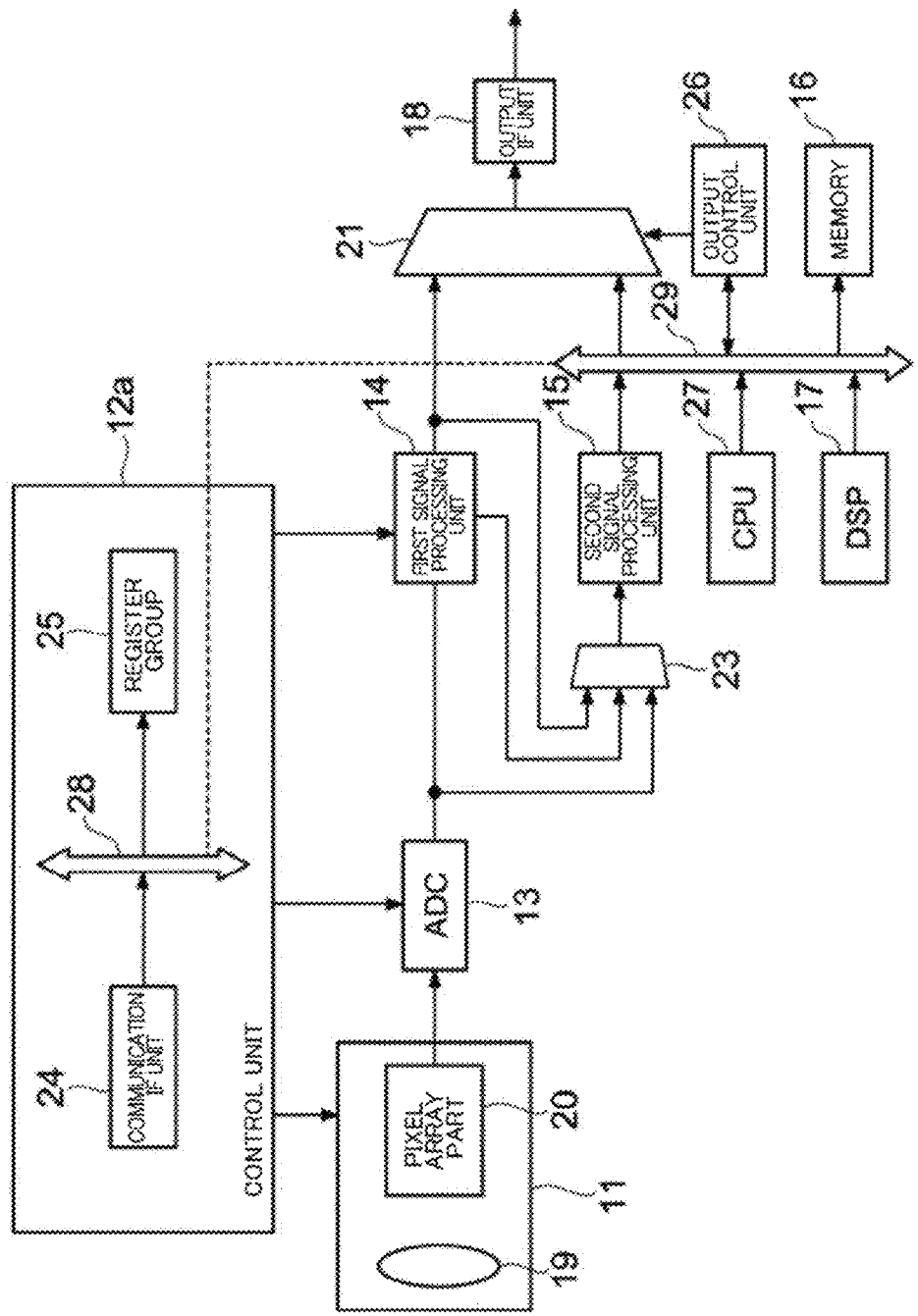
FIG. 5 is a block diagram showing a schematic configuration of an imaging device 1 in which a user can select any of the first to third examples of FIG. 2 to FIG. 4.

In FIG. 2 to FIG. 4 described above, data input to the second signal processing unit 15 is different, and which of FIG. 2 to FIG. 4 is superior depends on the time and cases. Therefore, a user may be able to select any of the first to third examples of FIG. 2 to FIG. 4 described above. FIG. 5 is a block diagram showing a schematic configuration of an imaging device 1 in which a user can select any of the first to third examples of FIG. 2 to FIG. 4. The imaging device 1 of FIG. 5 shows a more detailed block configuration than the imaging device 1 shown in FIG. 1. The imaging device 1 of FIG. 5 includes an input selector 23 for selecting input data of the second signal processing unit 15. The input selector 23 selects any one of digital pixel data from the ADC 13, that is, input data of the first signal processing unit 14, data obtained by the first signal processing unit 14 performing the first signal processing midway, and data obtained by the first signal processing unit 14 performing the first signal processing to the end, that is, output data of the first signal processing unit 14, and inputs the selected data to the second signal processing unit 15.

FIG. 5 shows the internal configuration of the control unit 12 in more detail. The control unit 12 includes a communication interface unit (communication IF unit) 24 and a register group 25 connected to a bus 28. The control unit 12 communicates with, for example, the application processor 3 and stores an instruction from the application processor 3 in the register group 25. The communication interface unit 24 performs inter-integrated circuit (I2C) communication through, for example, two signal lines, a clock signal line and a data input/output signal line. The communication method performed by the control unit 12 is not limited to I2C communication. Further, the communication destination device is not necessarily limited to the application processor 3. For example, it may be an image signal processor (ISP) that operates under the control of the application processor 3. In the example of FIG. 5, the application processor 3 or the ISP instructs the first signal processing unit 14 of specific details of the first signal processing via the communication interface unit 24.

Further, the imaging device 1 of FIG. 5 includes a CPU 27 separately from the DSP 17. The CPU 27 performs control of specific details of the second signal processing performed by the second signal processing unit 15, control of storing output data of the second signal processing unit 15 in the memory 16, and the like. An output control unit 26 performs control of storing data representing results of arithmetic operations performed by the DSP 17 in the memory 16 and control of transmitting this data to the selector 21.

The second signal processing unit 15, the CPU 27, the DSP 17, the memory 16, and the output control unit 26 are connected to a bus 29. This bus 29 is connected to the bus 29 in the control unit 12.

(Chip Structure of Imaging Device 1)

Next, a chip structure of the imaging device 1 of FIG. 1 will be described. FIG. 6 is a diagram showing an example of the chip structure of the imaging device 1 of FIG. 1. The imaging device 1 of FIG. 6 is a laminated body in which a first substrate 31 and a second substrate 32 are laminated. The first substrate 31 and the second substrate 32 may be called dies. Although FIG. 6 shows an example in which the first substrate 31 and the second substrate 32 are rectangular, specific shapes and sizes of the first substrate 31 and the second substrate 32 are arbitrary. Further, the first substrate 31 and the second substrate 32 may have the same size or different sizes.

The pixel array part 20 shown in FIG. 1 is disposed on the first substrate 31. Further, at least a part of the optical system 19 of the imaging unit 11 may be mounted on the first substrate 31 on-chip.

The control unit 12, the ADC 13, the first signal processing unit 14, the second signal processing unit 15, the memory 16, the DSP 17, and the selector 21 shown in FIG. 1 are disposed on the second substrate 32. In addition, an input/output interface unit, a power supply circuit, and the like which are not illustrated may be disposed on the second substrate 32.

As a specific form of bonding, for example, a so-called Chip on Chip (CoC) method in which the first substrate 31 and the second substrate 32 are cut out from wafers, individualized, and then vertically laminated and bonded may be adopted. Alternatively, a so-called Chip on Wafer (CoW) method in which one (e.g., the first substrate 31) of the first substrate 31 and the second substrate 32 is cut out from a wafer and individualized, and then the individualized first substrate 31 is bonded to the individualized second substrate 32 may be adopted. Alternatively, a so-called Wafer on Wafer (WoW) method in which the first substrate 31 and the second substrate 32 are bonded in a wafer state may be adopted.

For example, plasma bonding or the like can be used as a method of bonding the first substrate 31 and the second substrate 32. However, various other bonding methods may be used.

Figure 7A:
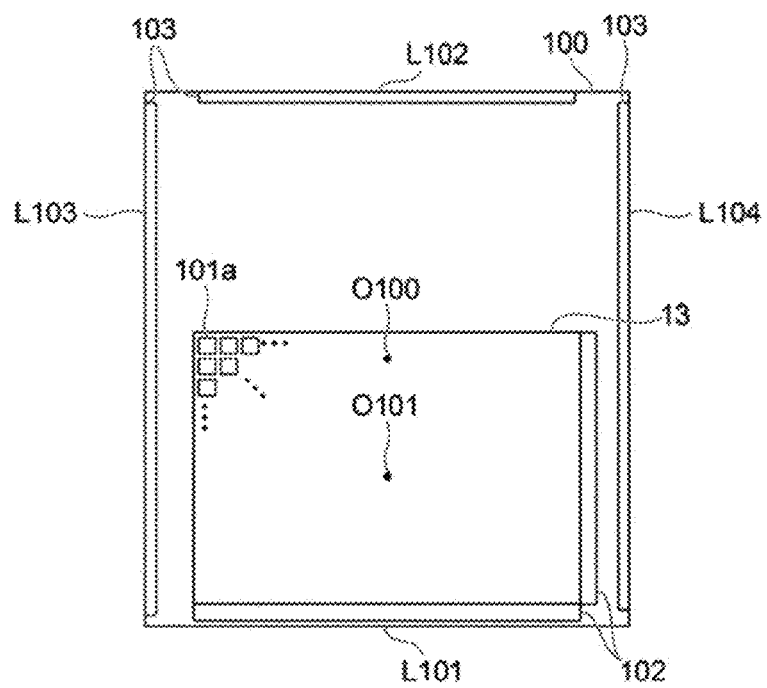
FIG. 7A is a diagram showing an example of a layout of a first substrate on which a pixel array part is disposed.
Figure 7B:
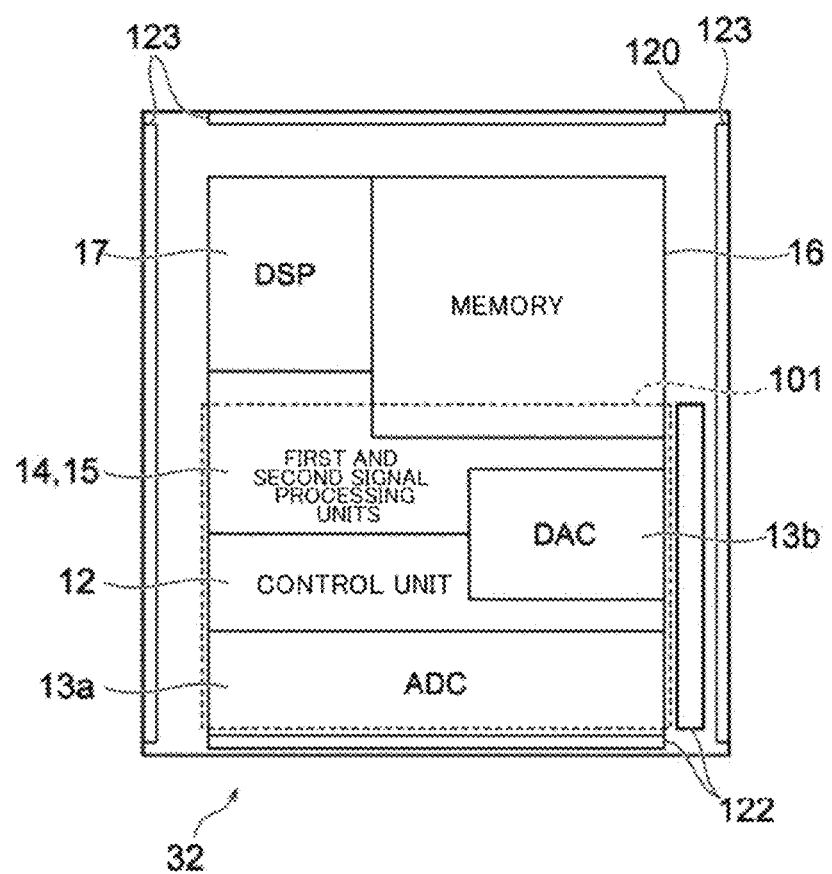
FIG. 7B is a diagram showing an example of a layout of a second substrate.

FIG. 7A and FIG. 7B are diagrams showing an example of layouts of the first substrate 31 and the second substrate 32. FIG. 7A shows a layout example of the first substrate 31 in which the pixel array part 20 is disposed. In the example of FIG. 7A, the pixel array part 20 is disposed on one side L101 side of four sides L101 to L104 of the first substrate 31. In other words, the pixel array part 20 is disposed such that the center portion O101 thereof is closer to the side L101 than the center portion O100 of the first substrate 31. When the surface of the first substrate 31 on which the pixel array part 20 is provided is rectangular, the side L101 may be, for example, a shorter side. However, the present disclosure is not limited thereto, and the pixel array part 20 may be disposed on a longer side.

In an area close to the side L101 among the four sides of the pixel array part 20, in other words, in an area between the side L101 and the pixel array part 20, a through silicon via (hereinafter referred to as TSV) array 102 in which a plurality of TSVs penetrating the first substrate 31 are arranged as wires for electrically connecting each unit pixel 101a in the pixel array part 20 to the ADC 13 arranged on the second substrate 32 is provided. By arranging the TSV array 102 close to the side L101 close to the pixel array part 20 in this manner, it is possible to easily secure a space for arranging each unit such as the ADC 13 on the second substrate 32.

Meanwhile, the TSV array 102 may be provided in an area close to the side L104 which is one of the two sides L103 and L104 intersecting the side L101 (or the side L103), in other words, an area between the side L104 (or the side L103) and the pixel array part 20.

A pad array 103 composed of a plurality of linearly arranged pads is provided on each of sides L102 to L103 on which the pixel array part 20 is not disposed among the four sides L101 to L104 of the first substrate 31. The pad array 103 may include, for example, pads (also referred to as power supply pins) to which a power supply voltage for analog circuits such as the pixel array part 20 and the ADC 13 is applied. Further, the pad array 103 may include pads (also referred to as power supply pins) to which a power supply voltage for digital circuits such as the first signal processing unit 14, the second signal processing unit 15, the DSP 17, the memory 16, the selector 21, and the control unit 12 is applied. Alternatively, the pad array 103 may include pads (also referred to as signal pins) for interfaces such as a mobile industry processor interface (MIPI) and a serial peripheral interface (SPI). Alternatively, the pad array 103 may include pads (also referred to as signal pins) for input/output of clocks and data. Each pad is electrically connected to, for example, an external power supply circuit or an interface circuit via a wire. It is desirable that each pad array 103 and the TSV array 102 be sufficiently separated from each other such that the influence of reflection of a signal from a wire connected to each pad in the pad array 103 can be ignored.

FIG. 7B shows a layout example of the second substrate 32 on which the control unit 12, the ADC 13, the first signal processing unit 14, the second signal processing unit 15, the memory 16, the DSP 17, and the selector 21 are disposed. The ADC 13, the control unit 12, the first signal processing unit 14, the second signal processing unit 15, the DSP 17, and the memory 16 are disposed on the second substrate 32. In the layout example of FIG. 7B, the ADC 13 is divided into two areas, an ADC unit 13a and a digital-to-analog converter (DAC) 13b. The DAC 13b is a component that supplies a reference voltage for AD conversion the ADC unit 13a and is a component included in a part of the ADC unit 13a in a broad sense. Further, although not illustrated in FIG. 7B, the selector 21 is also disposed on the second substrate 32.

In addition, wiring 122 electrically connected by coming into contact with each TSV in the TSV array 102 (hereinafter, simply referred to as a TSV array 102) penetrating the first substrate 31 is provided on the second substrate 32. Further, a pad array 123 in which a plurality of pads are linearly arranged is electrically connected to each pad in the pad array 103 of the first substrate 31 is provided on the second substrate 32.

For connection between the TSV array 102 and wiring 122, for example, a so-called twin TSV method in which two TSVs, a TSV provided on the first substrate 31 and a TSV provided from the first substrate 31 to the second substrate 32, are connected on the outer surface of the chip may be adopted. Alternatively, a so-called shared TSV method in which connection is achieved through a common TSV provided from the first substrate 31 to the second substrate 32 may be adopted. However, the present disclosure is not limited thereto, and various connection forms such as a so-called Cu—Cu bonding method in which copper (Cu) exposed to the bonding surface of the first substrate 31 and copper (Cu) exposed to the bonding surface of the second substrate 32 are bonded to each other can be adopted.

The form of connection between each pad in the pad array 103 of the first substrate 31 and each pad in the pad array 123 of the second substrate 32 is, for example, wire bonding. However, the present disclosure is not limited thereto, and a connection form such as a through-hole or castellation may be used.

In the layout example of the second substrate 32, for example, the vicinity of the wiring 122 connected to the TSV array 102 is set as the upstream side, and the ADC unit 13a, the first signal processing unit 14, the second signal processing unit 15, and the DSP 17 are disposed in order from the upstream side along the flow of a signal read from the pixel array part 20. That is, the ADC unit 13a to which a pixel signal read from the pixel array part 20 is first input is disposed in the vicinity of the wiring 122 on the most upstream side, the first signal processing unit 14 and the second signal processing unit 15 are disposed following the ADC unit 13a, and the DSP 17 is disposed in an area farthest from the wiring 122. By using a layout in which the ADC 13 to the DSP 17 are disposed from the upstream side along the signal flow in this manner, wiring for connecting units can be shortened. Accordingly, signal delay can be reduced, signal propagation loss can be reduced, an S/N ratio can be improved, and power consumption can be reduced.

Further, the control unit 12 is disposed, for example, in the vicinity of the wiring 122 on the upstream side. In FIG. 7B, the control unit 12 is disposed between the ADC 13 and the first signal processing unit 14. With such a layout, it is possible to reduce signal delay, decrease signal propagation loss, improve an S/N ratio, and reduce power consumption when the control unit 12 controls the pixel array part 20. Further, signal pins and power supply pins for analog circuits can be disposed together in the vicinity of the analog circuits (for example, the lower side in FIG. 7B), and the remaining signal pins and power supply pins for digital circuits can be disposed together in the vicinity of the digital circuits (for example, the upper side in FIG. 7B), or the power supply pins for the analog circuits and the power supply pins for the digital circuits can be disposed to be sufficiently apart from each other.

Further, in the layout shown in FIG. 7B, the DSP 17 is disposed on the side opposite to the ADC unit 13a on the most downstream side. With such a layout, in other words, in the direction in which the first substrate 31 and the second substrate 32 are laminated (hereinafter, simply referred to as a vertical direction), the DSP 17 can be disposed in an area that does not overlap the pixel array part 20.

By employing a configuration in which the pixel array part 20 and the DSP 17 do not overlap in the vertical direction in this manner, it is possible to curb noise generated by the DSP 17 executing signal processing from entering the pixel array part 20. As a result, even when the DSP 17 is operated as a processing unit that executes arithmetic operations based on a trained model, it is possible to curb noise caused by signal processing of the DSP 17 from entering the pixel array part 20, and thus it is possible to acquire an image with reduced quality deterioration.

The memory 16 is disposed in the vicinity of the DSP 17 and the second signal processing unit 15. Various types of information on trained computation models are stored in the memory 16, and the DSP 17 reads information on a computation model from the memory 16, performs arithmetic operation processing using the computation model, and stores results of arithmetic operation processing in the memory 16. Accordingly, by arranging the memory 16 in the vicinity of the DSP 17, signal propagation time at the time of accessing the memory 16 can be reduced and thus the DSP 17 can access the memory 16 at a high speed.

The pad array 123 is disposed, for example, at a position on the second substrate 32 corresponding to the pad array 103 of the first substrate 31 in the vertical direction. Here, among the pads included in the pad array 123, pads located in the vicinity of the ADC unit 13a are used to propagate the power supply voltage and analog signals for analog circuits (mainly the ADC unit 13a). On the other hand, pads located in the vicinity of the control unit 12, the second signal processing unit 15, the DSP 17, and the memory 16 are used to propagate the power supply voltage and digital signals for digital circuits (mainly, the control unit 12, the first signal processing unit 14, the second signal processing unit 15, the DSP 17, and the memory 16). With such a pad layout, the distance of wiring for connecting each pad and each unit can be shortened. Accordingly, it is possible to reduce signal delay, decrease propagation loss of signals and the power supply voltage, improve an S/N ratio, and reduce power consumption.

Figure 8:
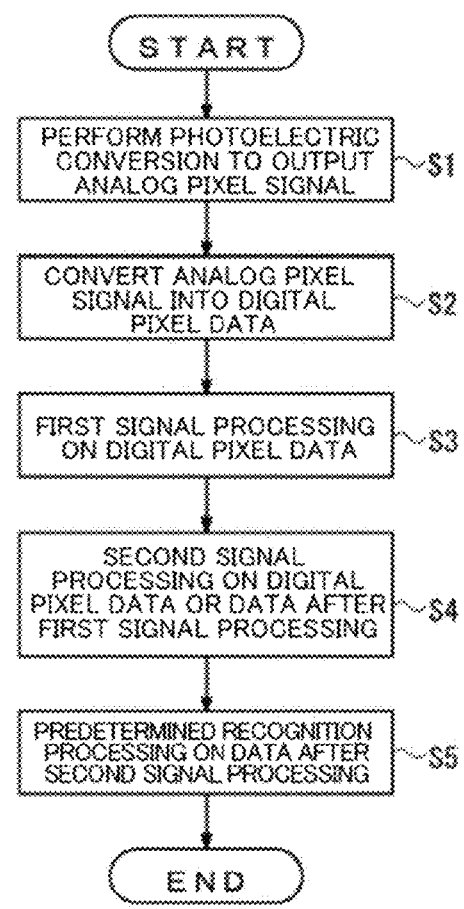
FIG. 8 is a flowchart showing a processing procedure performed by the imaging device according to the first embodiment.

FIG. 8 is a flowchart showing a processing procedure performed by the imaging device 1 according to the first embodiment. First, photoelectric conversion is performed in the pixel array part 20 and an analog pixel signal is output (step S1). Next, the analog pixel signal is converted into digital pixel data (step S2). Next, first signal processing is performed on the digital pixel data (step S3). Next, second signal processing that is at least partly shared by the first signal processing is performed on the digital pixel data or data obtained by performing at least a part of the first signal processing (step S4). Next, predetermined recognition processing is performed on the basis of data that has been subjected to the second signal processing (step S5). Next, at least one of the data that has been subjected to the first signal processing and the data that has been subjected to the recognition processing is output (step S6).

As described above, the imaging device 1 according to the first embodiment includes two signal processing units (the first signal processing unit 14 and the second signal processing unit 15), and the second signal processing unit 15 can generate input data optimal for the DSP 17 to perform arithmetic operation processing according to a trained DNN through the second signal processing even if the first signal processing unit 14 has performed the first signal processing according to an instruction of the application processor 3 or the like. Therefore, recognition accuracy of recognition processing using the DNN can be improved.

In addition, at the stage where the first signal processing unit 14 has performed the first signal processing midway, output data up to that point can be input to the second signal processing unit 15 to perform the second signal processing, and thus the second signal processing can be started after the first signal processing unit 14 performs signal processing that is not included in the second signal processing unit 15. Accordingly, the number of types of signal processing to be performed by the second signal processing unit 15 can be reduced, the internal configuration of the second signal processing unit 15 can be simplified, and the imaging device 1 can be miniaturized.

Further, it is also possible to start the second signal processing performed by the second signal processing unit 15 after the first signal processing is performed to the end by the first signal processing unit 14. Accordingly, the second signal processing unit 15 can perform the second signal processing by further reflecting instructions of the application processor 3 and the like.

Second Embodiment

As shown in FIG. 5, the application processor 3, the ISP, or the like includes only one communication interface unit 24 for controlling the imaging device 1 in the first embodiment. However, when both the application processor 3 and the ISP are present, it may be desirable that the application processor 3 and the ISP be able to individually control the imaging device 1. In addition, when the application processor 3 or the ISP has a plurality of communication channels and individual communication can be performed through each communication channel, the communication efficiency is improved if communication with the imaging device 1 can be performed using the plurality of communication channels in parallel. Therefore, a control unit 12a in an imaging device 1 according to a second embodiment is characterized by including a plurality of communication interface units.

The plurality of communication interface units according to the second embodiment are component for transmitting and receiving information for individually controlling at least two of the converter 13, the first signal processing unit 14, the second signal processing unit 15, and a recognition processing unit from the outside (for example, the application processor 3). The plurality of communication interface units individually output at least two pieces of digital pixel data output from the converter 13, output data of the first signal processing unit 14, output data of the second signal processing unit 15, and output data of the recognition processing unit.

Figure 9:
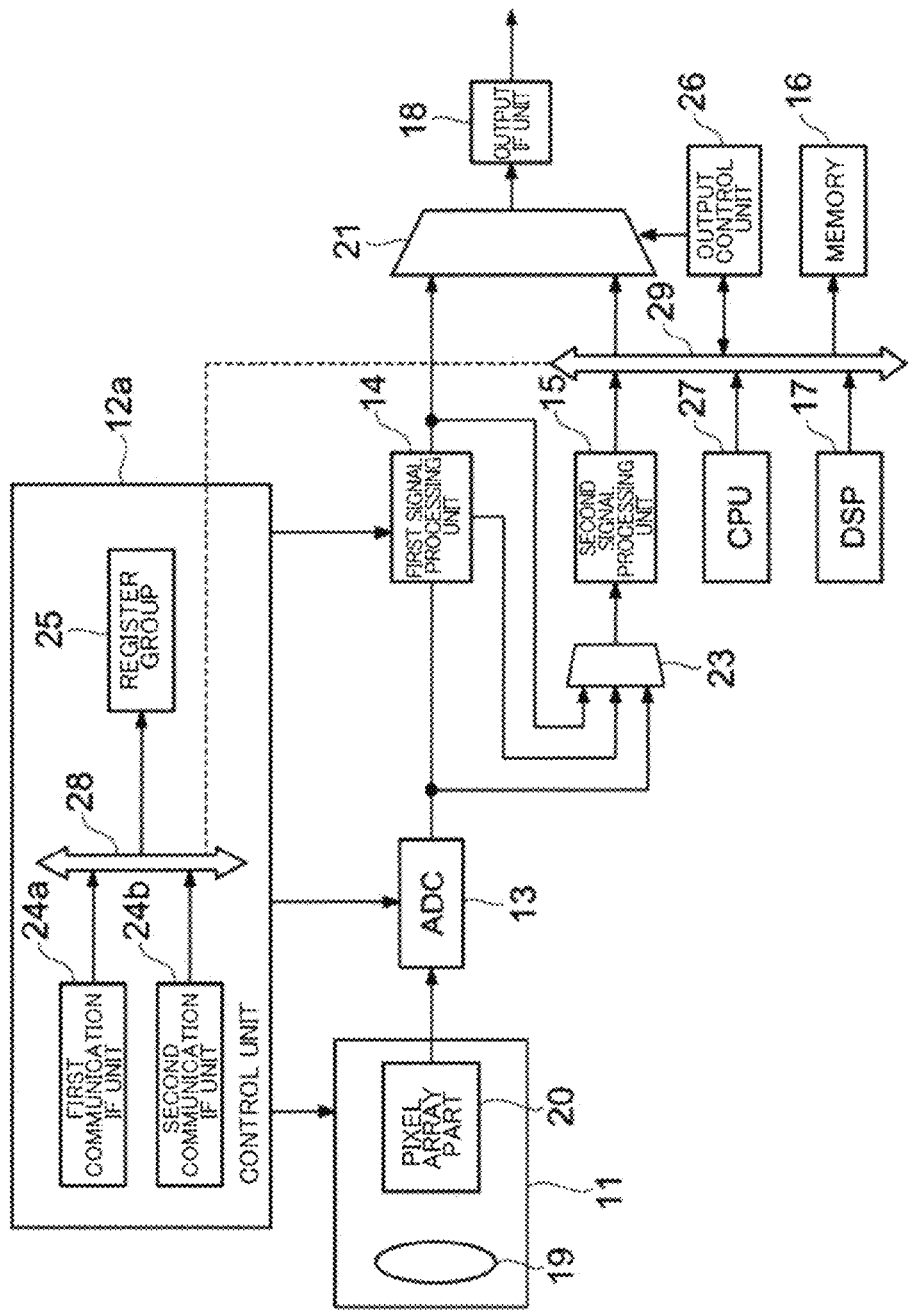
FIG. 9 is a block diagram showing a schematic configuration of an imaging device according to a second embodiment.

FIG. 9 is a block diagram showing a schematic configuration of the imaging device 1 according to the second embodiment. In FIG. 9, the same components as those in FIG. 5 are designated by the same reference numerals, and differences will be mainly described below. The imaging device 1 of FIG. 9 differ from that of FIG. 5 in that a plurality of communication interface units 24a and 24b are provided in the control unit 12a in addition to the configuration of FIG. 5, and other components are the same as those of the imaging device of FIG. 5. Although an example in which the control unit 12a includes the first communication interface unit 24a and the second communication interface unit 24b will be described below, the control unit 12a may include three or more communication interface units 24. The first signal processing unit 14 and the second signal processing unit 15 in the imaging device 1 of FIG. 9 are connected in any form of FIG. 2 to FIG. 4.

The first communication interface unit 24a is used for the application processor 3 or the ISP to control the first signal processing unit 14. More specifically, the application processor 3 or the ISP instructs each unit in the first signal processing unit 14 whether or not it will perform signal processing via the first communication interface unit 24a. For example, the application processor 3 or the ISP instructs the defect correction unit 14b and the digital cropping/scaling unit 14e in the first signal processing unit 14 not to perform processing.

The second communication interface unit 24b is used, for example, for the application processor 3, the ISP, or the like to communicate with the second signal processing unit 15. As a more specific example, if data input to a DNN is affected by whether or not some signal processing in the second signal processing are performed when the DSP 17 performs DNN processing, the application processor 3 or the ISP controls whether or not some signal processing in the second signal processing will be performed via the second communication interface unit 24b.

Further, when the application processor 3 or the ISP has a plurality of communication channels and can individually perform communication through these communication channels, the plurality of communication channels can be allocated to the first and second communication interface units 24a and 24b and the first signal processing unit 14 and the second signal processing unit 15 can be controlled through the plurality of communication channels and the plurality of corresponding communication interface units 24a and 24b.

Accordingly, it is possible to individually control the first signal processing unit 14 and the second signal processing unit 15 by the application processor 3 or the ISP via the plurality of communication channels. It may be possible to control a plurality of processing units in the first signal processing unit 14 through the plurality of communication channel instead of individually controlling the first signal processing unit 14 and the second signal processing unit 15 through the plurality of communication channels.

Figure 10:
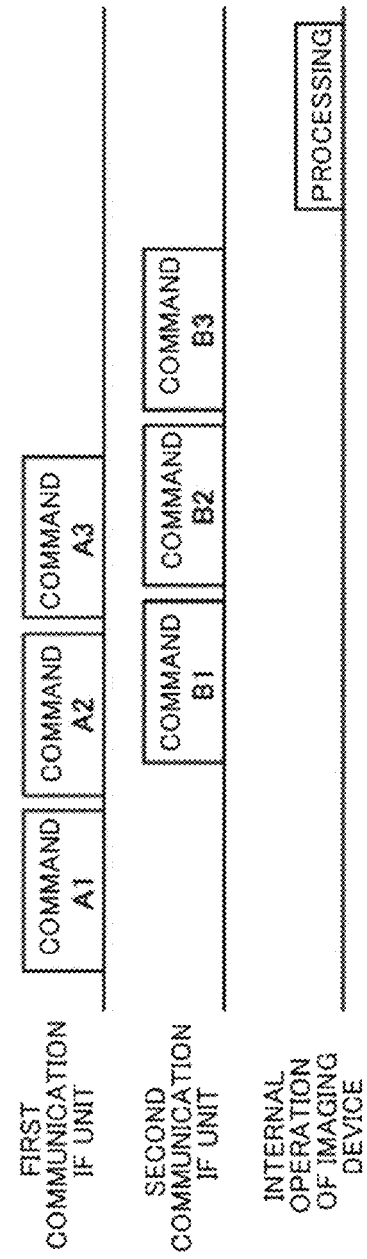
FIG. 10 is a diagram showing an example of data transmitted/received between a first communication interface unit and a second communication interface unit.

FIG. 10 is a diagram showing an example of data transmitted/received through the first communication interface unit 24a and the second communication interface unit 24b. As shown in FIG. 10, data is transmitted and received at separate timings in the first communication interface unit 24a and the second communication interface unit 24b. Although FIG. 10 shows an example in which commands (A1, A2, and A3) from the application processor 3 or the ISP are transmitted and received by the first communication interface unit 24a, and commands (B1, B2, and B3) are transmitted and received by the second communication interface unit 24b, specific details of data transmitted and received are arbitrary Since the first communication interface unit 24a and the second communication interface unit 24b can transmit and receive separate pieces of data asynchronously, for example, the ISP can also transmit and receive commands through the second communication interface unit 24b in parallel with transmission and reception of commands by the application processor 3 through the first communication interface unit 24a. Alternatively, the application processor 3 or the ISP can also transmit commands for two channels using both the first communication interface unit 24a and the second communication interface unit 24b.

As shown in FIG. 10, the imaging device 1 receives a command through both the first communication interface unit 24a and the second communication interface unit 24b, and then performs a processing operation according to the received command. Processing results of the imaging device 1 is returned to a command transmission source through the first communication interface unit 24a and the second communication interface unit 24b as necessary.

As described above, since the control unit 12a in the imaging device 1 is provided with the plurality of communication interface units 24a and 24b in the second embodiment, the application processor 3, the ISP, and the like can perform a plurality of communications with the control unit 12a via the plurality of communication interface units 24a and 24b in parallel. Accordingly, the application processor 3, the ISP, and the like can efficiently communicate with the imaging device 1.

(Application to Other Sensors)

Although a case where the technology according to the present disclosure is applied to the imaging device (image sensor) 1 that acquires a two-dimensional image is exemplified in the above-described first and second embodiments, the application destination of the technology according to the present disclosure is not limited to the imaging device. For example, the technology according to the present disclosure can be applied to various light receiving sensors such as a Time of Flight (ToF) sensor, an infrared (IR) sensor, and a dynamic vision sensor (DVS). That is, it is possible to reduce noise included in sensor results and decrease the size of a sensor chip by adopting a laminated type as a chip structure of a light receiving sensor.

Example of Application to Moving Body

The technology according to the present disclosure (the present technology) can be applied to various products. For example, the technology according to the present disclosure may be realized as a device mounted on any type of moving body such as an automobile, an electric vehicle, a hybrid electric vehicle, a motorcycle, a bicycle, a personal mobility, an airplane, a drone, a ship, and a robot.

Figure 11:
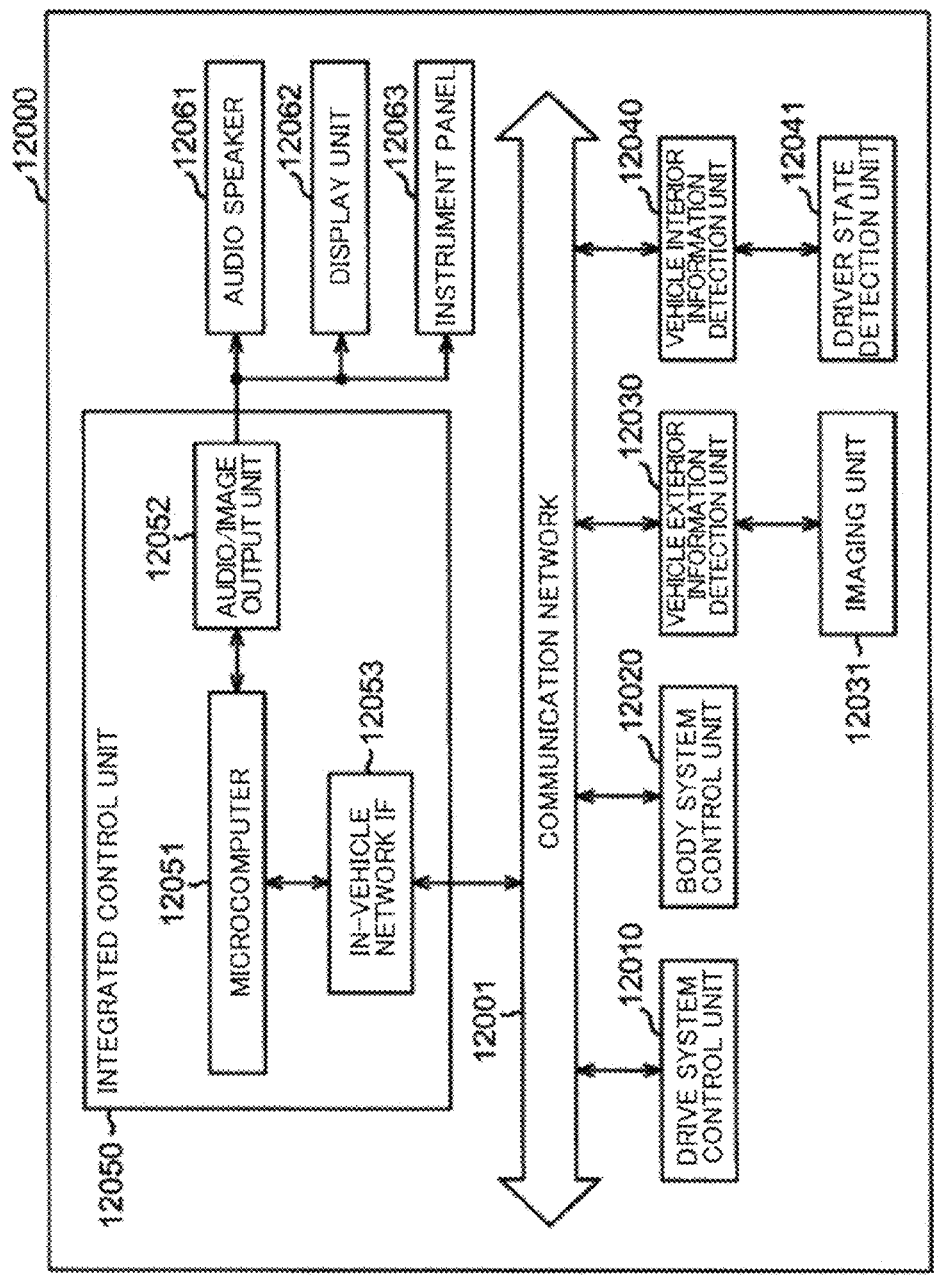
FIG. 11 is a block diagram showing a schematic configuration example of a vehicle control system that is an example of a moving body control system to which the technology according to the present disclosure can be applied.

FIG. 11 is a block diagram showing a schematic configuration example of a vehicle control system 12000 that is an example of a moving body control system to which the technology according to the present disclosure can be applied.

The vehicle control system 12000 includes a plurality of electronic control units connected via a communication network 12001. In the example illustrated in FIG. 11, the vehicle control system 12000 includes a drive system control unit 12010, a body system control unit 12020, a vehicle exterior information detection unit 12030, a vehicle interior information detection unit 12040, and an integrated control unit 12050. In addition, a microcomputer 12051, an audio/image output unit 12052, and an in-vehicle network interface (I/F) 12053 are included as functional components of the integrated control unit 12050 in the example illustrated in FIG. 11.

The drive system control unit 12010 controls operations of devices related to a drive system of a vehicle according to various programs. For example, the drive system control unit 12010 functions as a driving force generator for generating a driving force of a vehicle such as an internal combustion engine or a driving motor, a driving force transmission mechanism for transmitting a driving force to wheels, a steering mechanism for adjusting a turning angle of a vehicle, and a control device such as a braking device that generates a braking force of a vehicle.

The body system control unit 12020 controls operations of various devices mounted in the vehicle body according to various programs. For example, the body system control unit 12020 serves as a control device of a keyless entry system, a smart key system, a power window device, or various lamps such as a head lamp, a back lamp, a brake lamp, a turn signal, and a fog lamp. In this case, radio waves transmitted from a portable device that substitutes for a key or signals of various switches can be input to the body system control unit 12020. The body system control unit 12020 receives input of these radio waves or signals and controls a door lock device, a power window device, a lamp, and the like of the vehicle.

The vehicle exterior information detection unit 12030 detects information on the exterior of the vehicle in which the vehicle control system 12000 is mounted. For example, an imaging unit 12031 is connected to the vehicle exterior information detection unit 12030. The vehicle exterior information detection unit 12030 causes the imaging unit 12031 to capture an image of the exterior of the vehicle and receives the captured image. The vehicle exterior information detection unit 12030 may perform object detection processing or distance detection processing for persons, vehicles, obstacles, signs, or text on a road surface on the basis of the received image.

The imaging unit 12031 is an optical sensor that receives light and outputs an electrical signal corresponding to the amount of the received light. The imaging unit 12031 can also output the electrical signal as an image and ranging information. In addition, light received by the imaging unit 12031 may be visible light, or may be invisible light such as infrared light.

The vehicle interior information detection unit 12040 detects information on the interior of the vehicle. For example, a driver state detection unit 12041 that detects a driver's state is connected to the vehicle interior information detection unit 12040. The driver state detection unit 12041 includes, for example, a camera that captures an image of the driver, and the vehicle interior information detection unit 12040 may calculate a degree of fatigue or concentration of the driver or may determine whether or not the driver is dozing on the basis of detection information input from the driver state detection unit 12041.

The microcomputer 12051 can calculate a control target value of a driving force generation device, a steering mechanism, or a braking device on the basis of information on the interior and exterior of the vehicle acquired by the vehicle exterior information detection unit 12030 or the vehicle interior information detection unit 12040, and output a control command to the drive system control unit 12010. For example, the microcomputer 12051 can perform coordinated control for the purpose of realizing a function of an advanced driver assistance system (ADAS) including vehicle collision avoidance, shock alleviation, following travel based on an inter-vehicle distance, cruise control, vehicle collision warning, vehicle lane departure warning, or the like.

Further, the microcomputer 12051 can perform coordinated control for the purpose of automated driving or the like in which autonomous travel is performed without depending on an operation of a driver by controlling the driving force generator, the steering mechanism, the braking device, and the like on the basis of information regarding the vicinity of the vehicle acquired by the vehicle exterior information detection unit 12030 or the vehicle interior information detection unit 12040.

Furthermore, the microcomputer 12051 can output a control command to the body system control unit 12020 on the basis of vehicle exterior information acquired by the vehicle exterior information detection unit 12030. For example, the microcomputer 12051 can perform cooperative control for the purpose of preventing glare, such as switching from a high beam to a low beam, by controlling a headlamp according to the position of a preceding vehicle or an oncoming vehicle detected by the vehicle exterior information detection unit 12030.

The audio/image output unit 12052 transmits an output signal of at least one of audio and an image to an output device capable of visually or audibly notifying an occupant of the vehicle or the outside of the vehicle of information. In the example of FIG. 11, an audio speaker 12061, a display unit 12062, and an instrument panel 12063 are exemplified as the output device. The display unit 12062 may include, for example, at least one of an on-board display and a head-up display.

Figure 12:
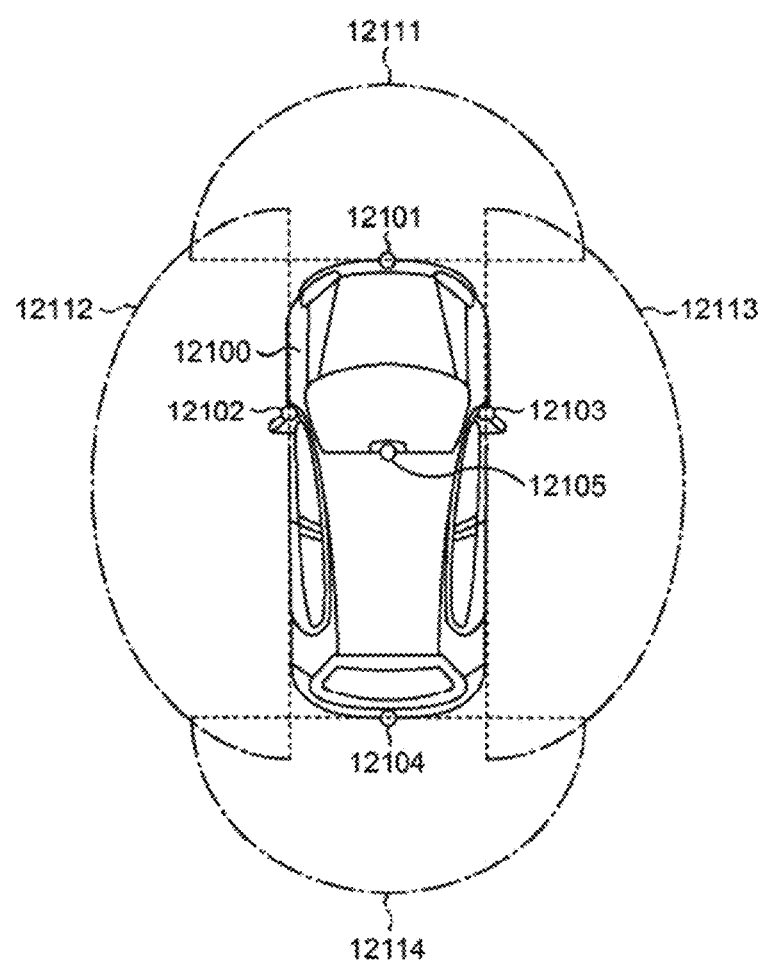
FIG. 12 is a diagram showing an example of an installation position of an imaging unit.

FIG. 12 is a diagram showing an example of positions at which the imaging unit 12031 is installed. In FIG. 12, imaging units 12101, 12102, 12103, 12104, and 12105 are included as the imaging unit 12031.

The imaging units 12101, 12102, 12103, 12104, and 12105 are provided, for example, at positions such as a front nose, side mirrors, a rear bumper, a backdoor, and an upper portion of a front glass inside the vehicle of the vehicle 12100. The imaging unit 12101 provided at the front nose and the imaging unit 12105 provided at the upper portion of the front glass inside the vehicle mainly acquire images on the front side of the vehicle 12100. The imaging units 12102 and 12103 provided at the side mirrors mainly acquire images on the lateral sides of the vehicle 12100. The imaging unit 12104 provided at the rear bumper or the backdoor mainly acquires rear view images of the vehicle 12100. The imaging unit 12105 included in the upper portion of the front glass inside the vehicle is mainly used to detect preceding vehicles or pedestrians, obstacles, traffic signals, traffic signs, lanes, and the like.

FIG. 12 shows an example of imaging ranges of the imaging units 12101 to 12104 by an alternate long and short dash line. An imaging range 12111 indicates an imaging range of the imaging unit 12101 provided at the front nose, imaging ranges 12112 and 12113 respectively indicate imaging ranges of the imaging units 12102 and 12103 provided at the side mirrors, and an imaging range 12114 indicates an imaging range of the imaging unit 12104 provided at the rear bumper or the back door. For example, a bird's-eye view image of the vehicle 12100 viewed from above can be obtained by superimposing image data captured by the imaging units 12101 to 12104.

At least one of the imaging units 12101 to 12104 may have a function of obtaining distance information. For example, at least one of the imaging units 12101 to 12104 may be a stereo camera composed of a plurality of imaging elements or may be an imaging element having pixels for phase difference detection.

For example, the microcomputer 12051 can extract a three-dimensional object traveling at a predetermined speed (for example, 0 km/h or more) in substantially the same direction as that of the vehicle 12100 which is particularly a closest three-dimensional object on a travel road of the vehicle 12100 as a preceding vehicle by obtaining a distance from each three-dimensional object within the imaging ranges 12111 to 12114 and a temporal change of the distance (a relative speed to the vehicle 12100) on the basis of distance information obtained from the imaging units 12101 to 12104. Further, the microcomputer 12051 can set an inter-vehicle distance which is guaranteed in advance before a preceding vehicle and perform automated brake control (also including following stop control), automated acceleration control (also including following start control), or the like. In this manner, it is possible to perform the coordinated control for automated driving or the like in which autonomous travel is performed without an operation of a driver.

For example, the microcomputer 12051 can classify and extract three-dimensional object data regarding three-dimensional objects into two-wheeled vehicles, ordinary vehicles, large vehicles, pedestrians, and other three-dimensional objects such as utility poles on the basis of distance information obtained from the imaging units 12101 to 12104 and use the three-dimensional object data for automatic avoidance of obstacles. For example, the microcomputer 12051 classifies obstacles in the vicinity of the vehicle 12100 into obstacles that can be visually recognized by the driver of the vehicle 12100 and obstacles that are difficult to visually recognize. Then, the microcomputer 12051 can determine a risk of collision indicating the degree of risk of collision with each obstacle, and can perform driving assistance for collision avoidance by outputting a warning to a driver through the audio speaker 12061 or the display unit 12062 and performing forced deceleration or avoidance steering through the drive system control unit 12010 when the risk of collision has a value equal to or greater than a set value and there is a possibility of collision.

At least one of the imaging units 12101 to 12104 may be an infrared camera that detects infrared light. For example, the microcomputer 12051 can recognize a pedestrian by determining whether or not a pedestrian is present in images captured by the imaging units 12101 to 12104. Such recognition of a pedestrian is performed by, for example, a procedure of extracting a feature point in captured images of the imaging units 12101 to 12104 serving as infrared cameras, and a procedure of performing pattern matching processing on a series of feature points indicating the contour of an object to determine whether or not the object is a pedestrian. When the microcomputer 12051 determines that a pedestrian is present in the captured images of the imaging units 12101 to 12104 and recognizes the pedestrian, the audio/image output unit 12052 controls the display unit 12062 such that a square contour line for emphasis is superimposed on the recognized pedestrian and is displayed. In addition, the audio/image output unit 12052 may control the display unit 12062 so that an icon or the like indicating a pedestrian is displayed at a desired position.

The example of the vehicle control system to which the technology according to the present disclosure is applied has been described above. The technology according to the present disclosure can be applied to the imaging unit 12031 and the like in the above-described configuration. By applying the technology according to the present disclosure to the imaging unit 12031 and the like, the imaging unit 12031 and the like can be miniaturized, and thus the interior or exterior of the vehicle 12100 can be easily designed. Further, by applying the technology according to the present disclosure to the imaging unit 12031 and the like, a clear image with reduced noise can be acquired and thus a more easily visible captured image can be provided to a driver. Accordingly, it is possible to reduce the fatigue of the driver.

Example of Application to Endoscopic Operation System

The technology according to the present disclosure (the present technology) can be applied to various products. For example, the technology according to the present disclosure may be applied to an endoscopic operation system.

Figure 13:
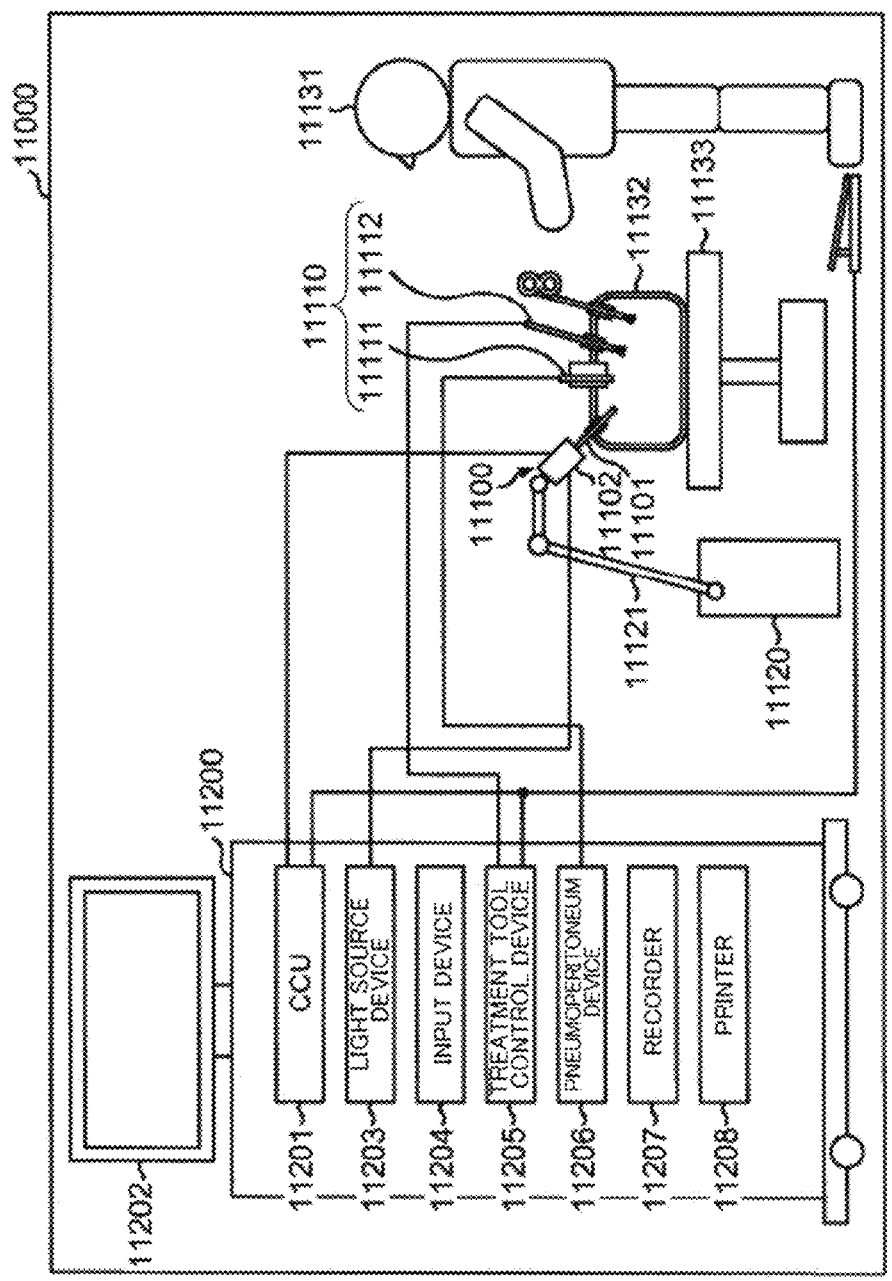
FIG. 13 is a diagram showing an example of a schematic configuration of an endoscopic operation system to which the technology according to the present disclosure (the present technology) can be applied.

FIG. 13 is a diagram illustrating an example of a schematic configuration of an endoscopic operation system to which the technology according to the present disclosure (the present technology) can be applied.

FIG. 13 shows a state where a surgeon (doctor) 11131 is performing a surgical operation on a patient 11132 on a patient bed 11133 by using the endoscopic operation system 11000. As illustrated, the endoscopic operation system 11000 includes an endoscope 11100, other surgical instruments 11110 such as a pneumoperitoneum tube 11111 and an energized treatment tool 11112, a support arm device 11120 that supports the endoscope 11100, and a cart 11200 equipped with various devices for endoscopic operation.

The endoscope 11100 includes a lens barrel 11101 of which a region having a predetermined length from a distal end is inserted into a body cavity of the patient 11132, and a camera head 11102 connected to a base end of the lens barrel 11101. Although the endoscope 11100 configured as a so-called rigid mirror having the rigid lens barrel 11101 is illustrated in the illustrated example, the endoscope 11100 may be configured as a so-called flexible mirror having a flexible lens barrel.

An opening in which an objective lens is fitted is provided at a distal end of the lens barrel 11101. A light source device 11203 is connected to the endoscope 11100, and light generated by the light source device 11203 is guided to the distal end of the lens barrel by a light guide extending inside the lens barrel 11101 and is radiated toward the observation target in the body cavity of the patient 11132 via the objective lens. The endoscope 11100 may be a direct-viewing endoscope or may be a perspective endoscope or a side-viewing endoscope.

An optical system and an imaging element are provided inside the camera head 11102, and the reflected light (observation light) from the observation target is condensed on the imaging element by the optical system. The observation light is photoelectrically converted by the imaging element, and an electrical signal corresponding to the observation light, that is, an image signal corresponding to an observation image is generated. The image signal is transmitted as RAW data to a camera control unit (CCU) 11201.

The CCU 11201 includes a central processing unit (CPU), a graphics processing unit (GPU), and the like, and integrally controls operations of the endoscope 11100 and a display device 11202. Further, the CCU 11201 receives the image signal from the camera head 11102 and performs various image processing such as development processing (demosaic processing) on the image signal for displaying an image based on the image signal.

The display device 11202 displays an image based on an image signal having been subjected to image processing by the CCU 11201 under the control of the CCU 11201.

The light source device 11203 includes a light source such as a light emitting diode (LED) and supplies the endoscope 11100 with radiation light for imaging a surgical site or the like.

An input device 11204 is an input interface for the endoscopic operation system 11000. The user can input various types of information or instructions to the endoscopic operation system 11000 via the input device 11204. For example, the user inputs an instruction to change imaging conditions (a type of radiated light, a magnification, a focal length, or the like) of the endoscope 11100.

A treatment tool control device 11205 controls driving of the energized treatment tool 11112 for cauterizing or incising tissue, sealing a blood vessel, or the like. A pneumoperitoneum device 11206 sends gas into the body cavity through a pneumoperitoneum tube 11111 in order to inflate the body cavity of the patient 11132 for the purpose of securing a visual field for the endoscope 11100 and a working space for the operator. A recorder 11207 is a device capable of recording various information regarding operations. A printer 11208 is a device that can print various types of information regarding operations in various formats such as text, images, or graphs.

The light source device 11203 that supplies the endoscope 11100 with radiation light for imaging a surgical part can be composed of, for example, an LED, a laser light source, or a white light source composed of a combination thereof. When a white light source is formed by a combination of RGB laser light sources, it is possible to control an output intensity and an output timing of each color (each wavelength) with high accuracy and thus, the light source device 11203 adjusts white balance of the captured image. Further, in this case, laser light from each of the respective RGB laser light sources is radiated to the observation target in a time division manner, and driving of the imaging element of the camera head 11102 is controlled in synchronization with radiation timing such that images corresponding to respective RGB can be captured in a time division manner. According to this method, it is possible to obtain a color image without providing a color filter to the imaging element.

Further, the driving of the light source device 11203 may be controlled to change the intensity of the output light at predetermined time intervals. It is possible to acquire images in a time-division manner by controlling the driving of the imaging element of the camera head 11102 in synchronization with a timing at which the intensity of the light is changed, and it is possible to generate a high dynamic range image without so-called blackout and whiteout by combining the images.

Further, the light source device 11203 may be configured to be able to supply light having a predetermined wavelength band corresponding to special light observation. In special light observation, so-called narrow band imaging, in which predetermined tissues such as blood vessels of the mucous membrane surface layer are imaged with high contrast, is performed by radiating light in a narrower band than radiated light (that is, white light) during normal observation, for example, by using wavelength dependence of light absorption in body tissues. Alternatively, in the special light observation, fluorescence observation in which an image is obtained using fluorescence generated through excitation light irradiation may be performed. In the fluorescence observation, it is possible to irradiate the body tissue with excitation light and observe the fluorescence from the body tissue (autofluorescence observation), to obtain a fluorescence image by locally injecting a reagent such as indocyanine green (ICG) into the body tissue and irradiating the body tissue with excitation light corresponding to the fluorescence wavelength of the reagent, or the like. The light source device 11203 may be configured to be able to supply the narrow band light and/or the excitation light corresponding to such special light observation.

Figure 14:
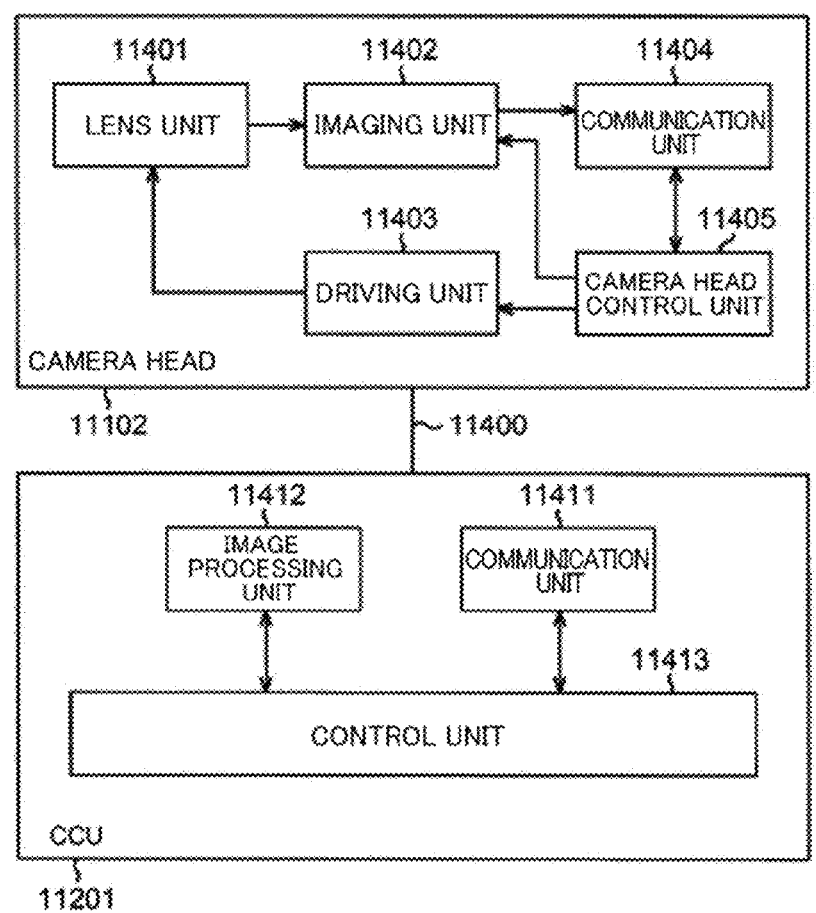
FIG. 14 is a block diagram showing an example of a functional configuration of a camera head and a CCU shown in FIG. 12.

FIG. 14 is a block diagram showing an example of a functional configuration of the camera head 11102 and the CCU 11201 shown in FIG. 13.

The camera head 11102 includes a lens unit 11401, an imaging unit 11402, a driving unit 11403, a communication unit 11404, and a camera head control unit 11405. The CCU 11201 includes a communication unit 11411, an image processing unit 11412, and a control unit 11413. The camera head 11102 and the CCU 11201 are communicably connected to each other via a transmission cable 11400.

The lens unit 11401 is an optical system provided at a portion for connection to the lens barrel 11101. The observation light taken in from the distal end of the lens barrel 11101 is guided to the camera head 11102 and incident on the lens unit 11401. The lens unit 11401 is configured in combination of a plurality of lenses including a zoom lens and a focus lens.

The number of imaging elements constituting the imaging unit 11402 may be one (so-called single-plate type) or plural (so-called multi-plate type). When the imaging unit 11402 is configured as a multi-plate type, image signals corresponding to R, G, and B, for example, may be generated by the respective imaging elements and may be combined to obtain a color image. Alternatively, the imaging unit 11402 may be configured to include a pair of image sensors for respectively acquiring right-eye image signals and left-eye image signals corresponding to 3D (dimensional) display. By performing the 3D display, the operator 11131 can understand a depth of a living tissue in the operation site more accurately. Also, in a case in which the imaging unit 11402 is configured as the multi-plate type, a plurality of lens units 11401 may be provided corresponding to each image sensor.

Further, the imaging unit 11402 may not be provided in the camera head 11102. For example, the imaging unit 11402 may be provided immediately after the objective lens inside the lens barrel 11101.

The driving unit 11403 includes an actuator, and moves the zoom lens and the focus lens of the lens unit 11401 by a predetermined distance along an optical axis under the control of the camera head control unit 11405. Accordingly, the magnification and focus of the image captured by the imaging unit 11402 can be adjusted appropriately.

The communication unit 11404 is composed of a communication device for transmitting/receiving various types of information to/from the CCU 11201. The communication unit 11404 transmits an image signal obtained from the imaging unit 11402 to the CCU 11201 through the transmission cable 11400 as RAW data.

The communication unit 11404 also receives a control signal for controlling driving of the camera head 11102 from the CCU 11201 and supplies the control signal to the camera head control unit 11405. The control signal includes, for example, information on the imaging conditions such as information indicating that the frame rate of the captured image is designated, information indicating that the exposure value at the time of imaging is designated, and/or information indicating that the magnification and the focus of the captured image are designated.

The imaging conditions such as the frame rate, the exposure value, the magnification, and the focus may be appropriately designated by the user, or may be automatically set by the control unit 11413 of the CCU 11201 on the basis of the acquired image signal. In the latter case, a so-called auto exposure (AE) function, auto focus (AF) function, and auto white balance (AWB) function are provided to the endoscope 11100.

The camera head control unit 11405 controls the driving of the camera head 11102 on the basis of the control signal from the CCU 11201 received via the communication unit 11404.

The communication unit 11411 includes a communication device for transmitting/receiving various types of information to/from the camera head 11102. The communication unit 11411 receives an image signal transmitted from the camera head 11102 via the transmission cable 11400.

In addition, the communication unit 11411 transmits a control signal for controlling the driving of the camera head 11102 to the camera head 11102. The image signal or the control signal can be transmitted by electric communication, optical communication, or the like.

The image processing unit 11412 performs various image processing on the image signal that is the RAW data transmitted from the camera head 11102.

The control unit 11413 performs various controls regarding imaging of the surgical part or the like using the endoscope 11100 and a display of a captured image obtained by imaging the surgical part or the like. For example, the control unit 11413 generates the control signal for controlling the driving of the camera head 11102.

Further, the control unit 11413 causes the display device 11202 to display the captured image obtained by imaging the surgical part or the like on the basis of the image signal subjected to the image processing by the image processing unit 11412. In this case, the control unit 11413 may recognize various objects in the captured image using various image recognition technologies. For example, the control unit 11413 can detect shapes and colors of edges of an object included in the captured image, thereby recognizing surgical instruments such as forceps, a specific living body part, bleeding, mist at the time of using the energized treatment tool 11112, and the like. The control unit 11413 may use the recognition results to superimpose and display various types of operation support information on the image of the surgical site when the captured image is displayed on the display device 11202. By displaying the operation support information in a superimposed manner and presenting it to the operator 11131, a burden on the operator 11131 can be reduced, and the operator 11131 can reliably proceed with the operation.

The transmission cable 11400 that connects the camera head 11102 to the CCU 11201 is an electrical signal cable compatible with communication of an electrical signal, an optical fiber compatible with optical communication, or a composite cable thereof.

Here, in the illustrated example, wired communication is performed using the transmission cable 11400, but the communication between the camera head 11102 and the CCU 11201 may be performed wirelessly.

An example of an endoscopic operation system to which the technology according to the present disclosure can be applied has been described. The technology according to the present disclosure can be applied to, for example, the imaging unit 11402 of the camera head 11102 among the components described above. By applying the technology according to the present disclosure to the camera head 11102, the camera head 11102 and the like can be miniaturized, and thus a compact configuration of the endoscopic operation system 11000 can be achieved. Further, by applying the technology according to the present disclosure to the camera head 11102 and the like, a clear image with reduced noise can be acquired, and thus a more easily visible captured image can be provided to an operator. Accordingly, it is possible to reduce the fatigue of the operator.

Although the endoscopic operation system has been described here as an example, the technology according to the present disclosure may be applied to other systems, for example, a microscopic operation system.

Example of Application to Whole Slide Imaging (WSI) System

The technology according to the present disclosure can be applied to various products. For example, the technology according to the present disclosure may be applied to a pathological diagnosis system, a support system thereof, or the like (hereinafter referred to as a diagnostic support system) in which a doctor or the like observes cells or tissues collected from a patient to diagnose a lesion. This diagnostic support system may be a whole slide imaging (WSI) system that diagnoses lesions on the basis of images acquired using digital pathology technology or support the diagnosis.

Figure 15:
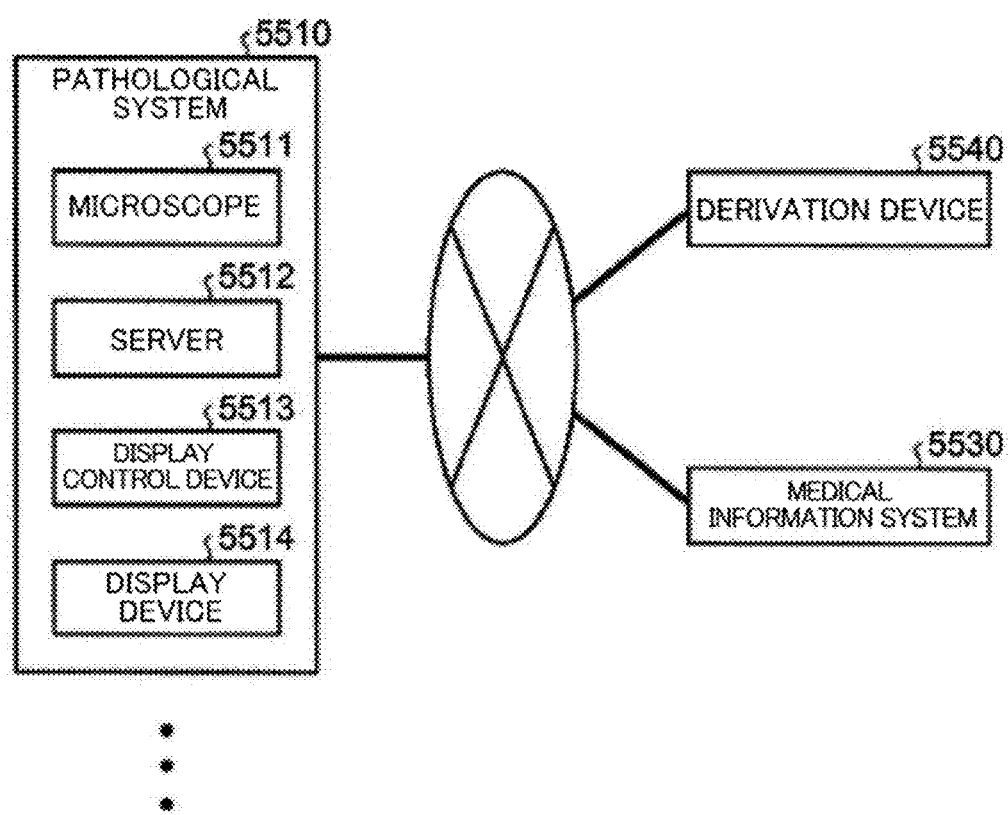
FIG. 15 is a diagram showing an example of a schematic configuration of a diagnostic support system to which the technology according to the present disclosure is applied.

FIG. 15 is a diagram showing an example of a schematic configuration of a diagnostic support system 5500 to which the technology according to the present disclosure is applied. As shown in FIG. 15, the diagnostic support system 5500 includes one or more pathological systems 5510. Further, a medical information system 5530 and a derivation device 5540 may be included.

Each of the one or more pathological systems 5510 is a system mainly used by pathologists and is introduced into, for example, laboratories or hospitals. The pathological systems 5510 may be introduced into different hospitals and are connected to the medical information system 5530 and the derivation device 5540 via various networks such as a wide area network (WAN) (including the Internet), a local area network (LAN), a public line network, and a mobile communication network.

Each pathological system 5510 includes a microscope 5511, a server 5512, a display control device 5513, and a display device 5514.

The microscope 5511 has a function of an optical microscope and images an observation target housed in a glass slide to acquire a pathological image which is a digital image. The observation target is, for example, tissues or cells collected from a patient and may be a piece s of flesh, saliva, blood, or the like of an organ.

The server 5512 stores and saves pathological images acquired by the microscope 5511 in a storage unit which is not shown. Further, the server 5512 searches for a pathological image from the storage unit which is not shown and sends the searched pathological image to the display control device 5513 when the server 5512 receives a viewing request from the display control device 5513.

The display control device 5513 sends a viewing request for a pathological image, received from a user, to the server 5512. Then, the display control device 5513 causes the display device 5514 to display the pathological image received from the server 5512 using a liquid crystal display, electro-luminescence (EL), a cathode ray tube (CRT), or the like. The display device 5514 may be compatible with 4K or 8K, and is not limited to one and may be a plurality of display devices.

Here, when an observation target is a solid substance such as a piece of flesh of an organ, the observation target may be, for example, a stained thin section. The thin section may be prepared, for example, by slicing a block piece cut out from a sample such as an organ. Further, the block pieces may be fixed with paraffin or the like at the time of slicing.

Various types of staining such as general staining showing the morphology of the tissue such as hematoxylin-eosin (HE) staining and immunostaining showing the immune status of the tissue such as immunohistochemistry (IHC) staining may be applied for staining of the thin section. In such a case, one thin section may be stained using a plurality of different reagents, or two or more thin sections (also referred to as adjacent thin sections) continuously cut out from the same block piece may be stained using different reagents.

The microscope 5511 may include a low-resolution imaging unit for imaging at low resolution and a high-resolution imaging unit for imaging at high resolution. The low-resolution imaging unit and the high-resolution imaging unit may have different optical systems or the same optical system. When they are the same optical system, the resolution of the microscope 5511 may be changed depending on imaging targets.

The glass slide containing an observation target is placed on a stage located within the angle of view of the microscope 5511. The microscope 5511 first acquires a whole image within the angle of view using the low-resolution imaging unit and identifies a region of an observation target from the acquired whole image. Subsequently, the microscope 5511 divides the region where the observation target is present into a plurality of divided regions having a predetermined size and sequentially images the divided regions by the high-resolution imaging unit to acquire a high-resolution image of each divided region. To switch divided regions that are targets, the stage may be moved, an imaging optical system may be moved, or both thereof may be moved.

Further, each divided region may overlap with the adjacent divided region in order to prevent the occurrence of an imaging omission region due to an unintended slip of the glass slide. Further, the whole image may include identification information for associating the whole image with the patient. This identification information may be, for example, a character string, a QR code (registered trademark), or the like.

High-resolution images acquired by the microscope 5511 are input to the server 5512. The server 5512 divides each high-resolution image into partial images (hereinafter referred to as tile images) having a smaller size. For example, the server 5512 divides one high-resolution image into 10×10 tiles images in vertical and horizontal directions, a total of 100 tile images. In such a case, if adjacent divided regions overlap, the server 5512 may perform stitching processing on high-resolution images adjacent to each other using a technique such as template matching. In that case, the server 5512 may generate tile images by dividing the entire high-resolution image bonded by stitching processing. However, tile images may be generated from high-resolution images before stitching processing.

In addition, the server 5512 may generate tile images having a smaller size by further dividing a tile image. Generation of such tile images may be repeated until tile images having a size set as a minimum unit are generated.

When the tile images in the minimum unit are generated in this manner, the server 5512 executes tile synthesis processing for generating one tile image by synthesizing a predetermined number of adjacent tile images for all the tile images. This tile synthesis processing can be repeated until one tile image is finally generated. According to such processing, a tile image group having a pyramid structure in which each layer is composed of one or more tile images is generated. In this pyramid structure, a tile image of one layer and a tile image of a different layer have the same number of pixels, but their resolutions are different. For example, when a total of four tile images of 2×2 are synthesized to generate one tile image in an upper layer, the resolution of the tile image in the upper layer is ½ times the resolution of the tile images in the lower layer used for synthesis.

By constructing a tile image group having such a pyramid structure, it is possible to switch the level of detail of an observation target displayed on the display device depending on the layer to which tile images that are targets belong. For example, a narrow region of the observation target can be displayed in detail when tile images of the lowest layer are used, and a wider region of the observation target can be displayed coarser when tile images of an upper layer are used.

The generated tile image group in the pyramid structure is stored in a storage unit which is not shown along with identification information (referred to as tile identification information) that can uniquely identify each tile image, for example. When the server 5512 receives a request for acquiring a tile image including tile identification information from another device (for example, the display control device 5513 or the derivation device 5540), the server 5512 transmits the tile image corresponding to the tile identification information to the other device.

A tile image, which is a pathological image, may be generated for each imaging condition such as a focal length or staining conditions. When a tile image is generated for each imaging condition, a specific pathological image and another pathological image that corresponds to an imaging condition different from a specific imaging condition and is in the same region as the specific pathological image may be displayed side by side. The specific imaging condition may be specified by a viewer. Further, when a plurality of imaging conditions are specified for the viewer, pathological images of the same region corresponding to each imaging condition may be displayed side by side.

In addition, the server 5512 may store the tile image group in the pyramid structure in a storage device other than the server 5512, for example, a cloud server or the like. Further, a part or all of above-described tile image generation processing may be executed by a cloud server or the like.

The display control device 5513 extracts a desired tile image from the tile image group in the pyramid structure in response to an input operation from the user and outputs the tile image to the display device 5514. According to such processing, the user can obtain a feeling of observing the observation target while changing an observation magnification. That is, the display control device 5513 serves as a virtual microscope. A virtual observation magnification here actually corresponds to the resolution.

Any method may be used as a method for capturing a high-resolution image. Divided regions may be imaged by repeatedly stopping and moving the stage to acquire a high-resolution image, or the divided area may be imaged by moving the stage at a predetermined speed to acquire a high-resolution image on a strip. In addition, processing of generating tile images from a high-resolution image is not an essential configuration, and an image having resolution changing in stages may be generated by changing the resolution of the entire high-resolution image bonded by stitching processing in stages. Even in this case, it is possible to present a low-resolution image in a wide area to a high-resolution image in a narrow area to the user in stages.

The medical information system 5530 is a so-called electronic medical record system and stores information regarding diagnosis such as patient identification information, patient disease information, examination information and image information used for diagnosis, diagnosis results, and prescription drugs. For example, a pathological image obtained by imaging an observation target of a certain patient can be once saved via the server 5512 and then displayed on the display device 5514 through the display control device 5513. A pathologist using the pathological system 5510 makes a pathological diagnosis on the basis of the pathological image displayed on the display device 5514. Results of the pathological diagnosis made by the pathologist are stored in the medical information system 5530.

The derivation device 5540 can perform analysis on a pathological image. A learning model created by machine learning can be used for this analysis. The derivation device 5540 may derive a classification result of a specific region, a tissue identification result, or the like as a result of the analysis. Further, the derivation device 5540 may derive identification results such as cell information, number, position, and luminance information, scoring information therefor, and the like. Such information derived by the derivation device 5540 may be displayed on the display device 5514 of the pathological system 5510 as diagnostic support information.

The derivation device 5540 may be a server system composed of one or more servers (including a cloud server) and the like. Further, the derivation device 5540 may be configured to be incorporated in, for example, the display control device 5513 or the server 5512 in the pathological system 5510. That is, various analyses on pathological images may be performed within the pathological system 5510.

The technology according to the present disclosure can be suitably applied to, for example, the microscope 5511 among the components described above. Specifically, the technology according to the present disclosure can be applied to the low-resolution imaging unit and/or the high-resolution imaging unit in the microscope 5511. By applying the technology according to the present disclosure to the low-resolution imaging unit and/or the high-resolution imaging unit, the low-resolution imaging unit and/or the high-resolution imaging unit can be miniaturized, and the microscope 5511 can be miniaturized. Accordingly, the microscope 5511 can be easily transported, which makes it possible to facilitate system introduction, system recombination, and the like. Furthermore, by applying the technology according to the present disclosure to the low-resolution imaging unit and/or the high-resolution imaging unit, a part or all of processing from acquisition of a pathological image to analysis of the pathological image can be performed on the fly in the microscope 5511, and thus it is possible to output diagnostic support information more rapidly and accurately.

The configuration described above can be applied not only to the diagnostic support system but also to general biological microscopes such as confocal microscopes, fluorescence microscopes, and video microscopes. Here, an observation target may be a biological sample such as cultured cells, a fertilized egg, or sperms, a biomaterial such as a cell sheet or a three-dimensional cell tissue, or a biological material such as a zebrafish or a mouse. Further, the observation target is not limited to the glass slide and can be observed in a state of being stored in a well plate, a Petri dish, or the like.

Further, a moving image may be generated from a still image of an observation target acquired by using a microscope. For example, a moving image may be generated from still images continuously captured for a predetermined period, or an image sequence may be generated from still images captured at predetermined intervals. By generating a moving image from still images in this manner, it is possible to analyze dynamic characteristics of an observation target, such as beating and elongation of cancer cells, nerve cells, myocardial tissue, or sperms, movement such as migration, or division processes of cultured cells and fertilized eggs, using machine learning.

The present technology can take the following configurations.

(1) An imaging device including a pixel array part having a plurality of pixels that perform photoelectric conversion,
a converter that converts an analog pixel signal output from the pixel array part into digital pixel data,
a first signal processing unit that performs first signal processing on the digital pixel data,
a second signal processing unit that performs second signal processing that is at least partly shared by the first signal processing on the digital pixel data or data that has been subjected to at least a part of the first signal processing,
a recognition processing unit that performs predetermined recognition processing on the basis of output data of the second signal processing unit, and
an output interface unit that outputs at least one of output data of the first signal processing unit and output data of the recognition processing unit.

(2) The imaging device according to (1), including a selector that selects the output data of the first signal processing unit or the output data of the recognition processing unit,
wherein the output interface unit outputs output data selected by the selector.

(3) The imaging device according to (1) or (2), wherein the first signal processing unit performs the first signal processing according to an instruction from the outside, and
the second signal processing unit performs the second signal processing according to the recognition processing.

(4) The imaging device according to any one of (1) to (3), wherein the first signal processing and the second signal processing include common signal processing, and
the second signal processing unit executes signal processing that has not been executed by the first signal processing unit according to an instruction from the outside, in the common signal processing.

(5) The imaging device according to any one of (1) to (3), wherein the first signal processing and the second signal processing include common signal processing, and
the second signal processing unit executes signal processing, executed by the first signal processing unit under first conditions according to an instruction from the outside, in the common signal processing, under second conditions different from the first conditions.

(6) The imaging device according to any one of (1) to (3), wherein the first signal processing and the second signal processing include common signal processing, and
when a result of signal processing executed by the first signal processing unit according to an instruction from the outside, in the common signal processing, is not suitable for the recognition processing, the second signal processing unit re-performs the signal processing executed by the first signal processing unit under conditions suitable for the recognition processing.

(7) The imaging device according to any one of (1) to (6), wherein the digital pixel data output from the converter is input to both the first signal processing unit and the second signal processing unit, and
the first signal processing unit and the second signal processing unit perform the first signal processing and the second signal processing on the digital pixel data in parallel.

(8) The imaging device according to any one of (1) to (6), wherein the digital pixel data output from the converter is input to the first signal processing unit, and data at a stage where the first signal processing unit has performed the first signal processing midway is input to the second signal processing unit.

(9) The imaging device according to any one of (1) to (6), wherein the digital pixel data output from the converter is input to the first signal processing unit, and data output by the first signal processing unit after completing the first signal processing is input to the second signal processing unit.

(10) The imaging device according to any one of (1) to (9), including a plurality of communication interface units for individually controlling at least two of the converter, the first signal processing unit, the second signal processing unit, and the recognition processing unit from the outside.

(11) The imaging device according to (10), wherein the plurality of communication interface units individually output at least two of the digital pixel data output from the converter, the output data of the first signal processing unit, the output data of the second signal processing unit, and the output data of the recognition processing unit.

(12) The imaging device according to any one of (1) to (11), including a first substrate having the pixel array part, and
a second substrate that is laminated on the first substrate and includes the converter, the signal processing units, and the light amount detector.

(13) The imaging device according to (12), wherein the first substrate and the second substrate are bonded to each other through any of a Chip on Chip (CoC) method, a Chip on Wafer (CoW) method, and a Wafer on Wafer (WoW) method.

(14) An electronic apparatus including an imaging device that outputs captured image data, and
a processor that performs predetermined signal processing on the image data, wherein the imaging device includes
a pixel array part having a plurality of pixels that perform photoelectric conversion,
a converter that converts an analog pixel signal output from the pixel array part into digital pixel data,
a first signal processing unit that performs first signal processing on the digital pixel data,
a second signal processing unit that performs second signal processing that is at least partly shared by the first signal processing on the digital pixel data or data that has been subjected to at least a part of the first signal processing,
a recognition processing unit that performs predetermined recognition processing on the basis of output data of the second signal processing unit, and
an output interface unit that outputs at least one of output data of the first signal processing unit and output data of the recognition processing unit.

(15) The electronic apparatus according to (14), wherein the imaging device includes a plurality of communication interface units for individually controlling at least two of the converter, the first signal processing unit, the second signal processing unit, and the recognition processing unit.

(16) An imaging method including a step of performing photoelectric conversion in a pixel array part to output an analog pixel signal,
a step of converting the analog pixel signal into digital pixel data,
a step of performing first signal processing on the digital pixel data,
a step of performing second signal processing that is at least partly shared by the first signal processing on the digital pixel data or data that has been subjected to at least a part of the first signal processing,
a step of performing predetermined recognition processing on the basis of data that has been subjected to the second signal processing, and
a step of outputting at least one of the data that has been subjected to the first signal processing and the data that has been subjected to the recognition processing.

The aspects of the present disclosure are not limited to the individual embodiments described above and also include various modifications that can be conceived by those skilled in the art, and the effects of the present disclosure are not limited to the above description. That is, various additions, changes and partial deletions are possible without departing from the conceptual idea and purpose of the present disclosure derived from the contents specified in the claims and their equivalents.

REFERENCE SIGNS LIST

1 Imaging device
2 Electronic apparatus
3 Application processor
11 Imaging unit
12 Control unit
13 Converter
14 First signal processing unit
14$a$ Clamping unit
14$b$ Defect correction unit
14$c$ Lens shading unit
14$d$ Digital bin/pixel center correction unit
14$e$ Digital cropping/scaling unit
15 Second signal processing unit
15$a$ Lens shading unit
15$b$ Demosaic unit
15$c$ Linear matrix/gamma/hue gain unit
15$d$ Dewarping unit
15$e$ Gain/YC matrix/normalization unit
15$f$ Rotation scaling unit
15$g$ Face detection/motion detection unit
16 Memory
17 DSP
18 Output interface unit
19 Optical system
20 Pixel array part
21 Selector
23 Input selector
24 Communication interface unit
24$a$ First communication interface unit
24$b$ Second communication interface unit
25 Register group
26 Output control unit
27 CPU
35 Network
36 Cloud server

The invention claimed is:

1. An imaging device comprising:
a pixel array having a plurality of pixels that perform photoelectric conversion;
a converter that converts an analog pixel signal output from the pixel array into digital pixel data;
first signal processing circuitry configured to perform first signal processing on the digital pixel data according to an instruction from an outside circuitry;
second signal processing circuitry configured to perform second signal processing on data that has been subjected to at least a part of the first signal processing, the first signal processing and the second signal processing partly having a same type of signal processing;
recognition processing circuitry configured to perform recognition processing on the basis of output data of the second signal processing circuitry; and
an output interface that outputs at least one of output data of the first signal processing circuitry and output data of the recognition processing circuitry, wherein
the first signal processing circuitry is further configured to execute at least a part of the same type of signal processing under a first condition according to the instruction from the outside circuitry, and the second signal processing circuitry is further configured to execute the part of the same type of signal processing under a second condition different from the first condition.

2. The imaging device according to claim 1, further comprising:
a selector that selects the output data of the first signal processing circuitry or the output data of the recognition processing circuitry, wherein
the output interface outputs output data selected by the selector.

3. The imaging device according to claim 1, wherein
the second signal processing circuitry is further configured to execute a portion of the same type of signal processing that portion has not been executed by the first signal processing circuitry according to the instruction from the outside circuitry.

4. The imaging device according to claim 1, wherein
in a case where a result of the same type of signal processing executed by the first signal processing circuitry according to the instruction from the outside circuitry is not suitable for the recognition processing, the second signal processing circuitry re-performs the same type of signal processing executed by the first signal processing circuitry under conditions suitable for the recognition processing.

5. The imaging device according to claim 1, wherein
the digital pixel data output from the converter is input to the first signal processing circuitry, and
data at a stage where the first signal processing circuitry has performed the part of the first signal processing is input to the second signal processing circuitry, the part of the first signal processing including the same type of signal processing.

6. The imaging device according to claim 1, wherein
the digital pixel data output from the converter is input to the first signal processing circuitry, and
data output by the first signal processing circuitry after completing the first signal processing is input to the second signal processing circuitry.

7. The imaging device according to claim 1, wherein
the imaging device includes a plurality of communication interfaces for individually controlling at least two of the converter, the first signal processing circuitry, the second signal processing circuitry, and the recognition processing circuitry from the outside circuitry.

8. The imaging device according to claim 7, wherein
the plurality of communication interfaces individually output at least two of the digital pixel data output from the converter, the output data of the first signal processing circuitry, the output data of the second signal processing circuitry, and the output data of the recognition processing circuitry.

9. The imaging device according to claim 1, further comprising:
a first substrate having the pixel array; and
a second substrate that is laminated on the first substrate and includes the converter, the first signal processing circuitry, the second signal processing circuitry, and the recognition processing circuitry.

10. The imaging device according to claim 9, wherein
the first substrate and the second substrate are bonded to each other through any of a Chip on Chip (CoC) method, a Chip on Wafer (CoW) method, and a Wafer on Wafer (WoW) method.

11. An electronic apparatus comprising:
an imaging device that outputs captured image data; and
a processor that performs predetermined signal processing on the captured image data, wherein
the imaging device includes:
a pixel array having a plurality of pixels that perform photoelectric conversion;
a converter that converts an analog pixel signal output from the pixel array into digital pixel data;
first signal processing circuitry configured to perform first signal processing on the digital pixel data according to an instruction from the processor;
second signal processing circuitry configured to perform second signal processing on data that has been subjected to at least a part of the first signal processing, the first signal processing and the second signal processing partly having a same type of signal processing;
recognition processing circuitry configured to perform recognition processing on the basis of output data of the second signal processing circuitry; and
an output interface that outputs at least one of output data of the first signal processing circuitry and output data of the recognition processing circuitry, wherein
the first signal processing circuitry is further configured to execute at least a part of the same type of signal processing under a first condition according to the instruction from the outside circuitry, and the second signal processing circuitry is further configured to execute the part of the same type of signal processing under a second condition different from the first condition.

12. The electronic apparatus according to claim 11, wherein
the imaging device includes a plurality of communication interfaces for individually controlling at least two of the converter, the first signal processing circuitry, the second signal processing circuitry, and the recognition processing circuitry from the processor.

13. An imaging method comprising:
performing photoelectric conversion in a pixel array to output an analog pixel signal;
converting the analog pixel signal into digital pixel data;
performing first signal processing on the digital pixel data according to an instruction from an outside circuitry;
performing second signal processing on data that has been subjected to at least a part of the first signal processing, the first signal processing and the second signal processing partly having a same type of signal processing;
performing recognition processing on the basis of data that has been subjected to the second signal processing; and
outputting at least one of the data that has been subjected to the first signal processing and the data that has been subjected to the recognition processing, wherein
performing the first signal processing includes execution of at least a part of the same type of signal processing under a first condition according to the instruction from the processor, and performing the second signal processing includes execution of the part of the same type of signal processing under a second condition different from the first condition.

* * * * *